US011280879B2

(12) United States Patent
Hong et al.

(10) Patent No.: US 11,280,879 B2
(45) Date of Patent: Mar. 22, 2022

(54) SYSTEM AND METHOD FOR RADAR INTERFERENCE MITIGATION

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 0 days.

(21) Appl. No.: 17/323,334

(22) Filed: May 18, 2021

(65) Prior Publication Data

US 2021/0389416 A1 Dec. 16, 2021

Related U.S. Application Data

(60) Provisional application No. 63/039,606, filed on Jun. 16, 2020.

(51) Int. Cl.
*G01S 7/02* (2006.01)
*G01S 13/02* (2006.01)

(52) U.S. Cl.
CPC .......... *G01S 7/0233* (2021.05); *G01S 7/0232* (2021.05); *G01S 13/02* (2013.01); *G01S 2013/0245* (2013.01)

(58) Field of Classification Search
CPC ...... G01S 7/0233; G01S 7/0232; G01S 13/02; G01S 2013/0245
USPC ....................................................... 342/128
See application file for complete search history.

(56) References Cited

U.S. PATENT DOCUMENTS

| | | |
|---|---|---|
| 3,691,560 A | 9/1972 | Hammack |
| 3,978,482 A | 8/1976 | Williams et al. |
| 4,042,927 A | 8/1977 | Helms |
| 4,084,158 A | 4/1978 | Slawsby |
| 4,246,585 A | 1/1981 | Mailloux |
| 4,544,927 A | 10/1985 | Kurth et al. |
| 4,546,355 A | 10/1985 | Boles |
| 4,717,916 A | 1/1988 | Adams et al. |
| 4,723,124 A | 2/1988 | Boles |
| 4,794,395 A | 12/1988 | Cindrich et al. |
| 4,996,532 A | 2/1991 | Kirimoto et al. |

(Continued)

FOREIGN PATENT DOCUMENTS

CN 206515399 U * 9/2017
EP 3816665 A1 * 5/2021 ............. G01S 7/023

(Continued)

OTHER PUBLICATIONS

International Search Report and Written Opinion for PCT Application No. PCT/US17/46708 dated Nov. 13, 2017.

(Continued)

*Primary Examiner* — Olumide Ajibade Akonai
*Assistant Examiner* — Alexander L. Syrkin
(74) *Attorney, Agent, or Firm* — Jeffrey Schox; Samuel Rosenthal

(57) ABSTRACT

A system for radar interference mitigation, preferably including one or more transmitter arrays, receiver arrays, and/or signal processors, and optionally including one or more velocity sensing modules. A method for radar interference mitigation, preferably including transmitting a set of probe signals, receiving a set of reflected probe signals, and/or evaluating interference, and optionally including decoding the set of received probe signals and/or compensating for interference.

25 Claims, 18 Drawing Sheets

(56) References Cited

U.S. PATENT DOCUMENTS

| | | | |
|---|---|---|---|
| 5,218,359 | A | 6/1993 | Minamisono |
| 5,225,839 | A | 7/1993 | Okurowski et al. |
| 5,278,757 | A | 1/1994 | Hoctor et al. |
| 5,847,673 | A | 12/1998 | Debell |
| 5,945,926 | A | 8/1999 | Ammar et al. |
| 7,535,409 | B1 | 5/2009 | Choe et al. |
| 7,609,198 | B2 | 10/2009 | Chang |
| 8,269,137 | B2 | 9/2012 | Ehrmann et al. |
| 8,312,771 | B2 | 11/2012 | Randall et al. |
| 8,482,455 | B2 | 7/2013 | Kemkemian et al. |
| 9,103,671 | B1 | 8/2015 | Breed et al. |
| 9,470,782 | B2 | 10/2016 | Millar et al. |
| 9,541,638 | B2 | 1/2017 | Jansen et al. |
| 9,869,762 | B1 | 1/2018 | Alland et al. |
| 10,048,366 | B1 | 8/2018 | Hong et al. |
| 10,359,512 | B1 * | 7/2019 | Hong ................ G01S 7/52019 |
| 10,509,119 | B2 | 12/2019 | Hong et al. |
| 2002/0180636 | A1 | 12/2002 | Lin et al. |
| 2004/0178951 | A1 | 9/2004 | Ponsford et al. |
| 2007/0013575 | A1 | 1/2007 | Lee et al. |
| 2007/0285315 | A1 | 12/2007 | Davis et al. |
| 2008/0122681 | A1 | 5/2008 | Shirakawa |
| 2008/0159416 | A1 | 7/2008 | Melick et al. |
| 2008/0291077 | A1 | 11/2008 | Chang |
| 2009/0135046 | A1 | 5/2009 | Steele et al. |
| 2009/0174590 | A1 | 7/2009 | Huizing et al. |
| 2009/0201206 | A1 | 8/2009 | Li et al. |
| 2009/0231181 | A1 | 9/2009 | Yannone |
| 2010/0019954 | A1 | 1/2010 | Mizutani et al. |
| 2010/0156701 | A1 | 6/2010 | Shirakawa |
| 2010/0194629 | A1 | 8/2010 | Craig et al. |
| 2010/0220001 | A1 | 9/2010 | Longstaff |
| 2010/0328157 | A1 | 12/2010 | Culkin et al. |
| 2011/0050500 | A1 | 3/2011 | Shirakawa |
| 2011/0241928 | A1 | 10/2011 | Oswald et al. |
| 2011/0298676 | A1 | 12/2011 | Yanagihara et al. |
| 2012/0001791 | A1 | 1/2012 | Wintermantel |
| 2012/0112954 | A1 | 5/2012 | Kurono et al. |
| 2012/0268309 | A1 * | 10/2012 | Samuel ................ F41G 7/2246 342/62 |
| 2012/0299773 | A1 | 11/2012 | Stirling-Gallacher et al. |
| 2013/0069818 | A1 | 3/2013 | Shirakawa et al. |
| 2013/0120191 | A1 | 5/2013 | Zhang et al. |
| 2013/0300596 | A1 | 11/2013 | Shirakawa |
| 2014/0197984 | A1 | 7/2014 | Wang et al. |
| 2014/0266898 | A1 | 9/2014 | Linnenbrink |
| 2015/0102954 | A1 | 4/2015 | Hong |
| 2015/0270609 | A1 | 9/2015 | Jin |
| 2016/0291130 | A1 * | 10/2016 | Ginsburg ................ G01S 7/40 |
| 2017/0031013 | A1 | 2/2017 | Halbert et al. |
| 2017/0082730 | A1 | 3/2017 | Kishigami et al. |
| 2017/0141454 | A1 | 5/2017 | Welle |
| 2017/0212213 | A1 | 7/2017 | Kishigami |
| 2017/0315229 | A1 | 11/2017 | Pavek et al. |
| 2018/0024235 | A1 * | 1/2018 | Hong ................ G01S 13/87 342/59 |
| 2018/0088224 | A1 | 3/2018 | Kishigami |
| 2019/0018128 | A1 | 1/2019 | Shollenberger |
| 2019/0212430 | A1 | 7/2019 | Akamine et al. |
| 2019/0265347 | A1 | 8/2019 | Wintermantel |
| 2019/0293787 | A1 | 9/2019 | Sakai et al. |
| 2019/0324133 | A1 | 10/2019 | Hong et al. |
| 2019/0339374 | A1 | 11/2019 | Kageme et al. |
| 2019/0386712 | A1 | 12/2019 | Fang |
| 2020/0025914 | A1 | 1/2020 | Li et al. |
| 2020/0081110 | A1 | 3/2020 | Nam et al. |
| 2020/0191939 | A1 | 6/2020 | Wu et al. |
| 2020/0191940 | A1 | 6/2020 | Wu et al. |
| 2020/0200892 | A1 | 6/2020 | Rajab et al. |

FOREIGN PATENT DOCUMENTS

| | | | |
|---|---|---|---|
| JP | 2008292264 A | 12/2008 | |
| JP | 2013068433 A * | 4/2013 | ........... G01S 13/347 |
| WO | 2019215734 A1 | 11/2019 | |

OTHER PUBLICATIONS

International Search Report for PCT Application No. PCT/US18/15873 dated May 8, 2018.

International Search Report and Written Opinion dated Oct. 4, 2019 for Application No. PCT/US2019/40696.

Gonzalez, Hector A., et al., "Doppler Ambiguity Resolution for Binary-Phase-Modulated MIMO FMCW Radars, 2019 International Radar Conference, Sep. 23-27, 2019."

Hott, Maurice, et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Li, et al., "Target Tracking in Uncertain Multipath Environment using Distributed Angle-of-Arrival Observation", retrieved from online on Apr. 4, 201 (Apr. 4, 2018); retrieved from URL:http://ieeexplore.ieee.org/document/7131228.

Rapp, Matthias, et al., "A Fast Probabilistic Ego-Motion Estimation Framework for Radak", 2015 European Conference on Mobile Robotics.

Sun, Hongbo, et al., "Analysis and Comparison of MIMO Radar Waveforms", 2014 International Radar Conference, Oct. 13-17, 2014.

* cited by examiner

SYSTEM AND METHOD FOR RADAR INTERFERENCE MITIGATION

CROSS-REFERENCE TO RELATED APPLICATIONS

This application claims the benefit of U.S. Provisional Application Ser. No. 63/039,606, filed on 16 Jun. 2020, which is incorporated in its entirety by this reference.

TECHNICAL FIELD

This invention relates generally to the radar field, and more specifically to a new and useful system and method for interference mitigation in the radar field.

BACKGROUND

Other radio signal sources present in an environment can interfere with efforts to determine information using radar systems and methods. Thus, there is a need in the radar field to create a new and useful system and method for interference mitigation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Benefits.

In many situations, the signals transmitted by multiple radar systems in an environment (e.g., collocated radar systems, radar systems deployed near each other, radar systems that are transiently located near each other such as in situations in which one or more of the radar systems are mobile, etc.) may interfere with the operation of some or all of the other nearby radar systems (e.g., FMCW radar systems that transmit frequency-modulated chirps). For example, transmissions from one radar system may be received (e.g., directly from the first radar system, after reflection by one or more other objects in the environment, etc.) by another radar system (e.g., operating independently from the first radar system), wherein they may cause one or more interference effects.

Figure 3C:
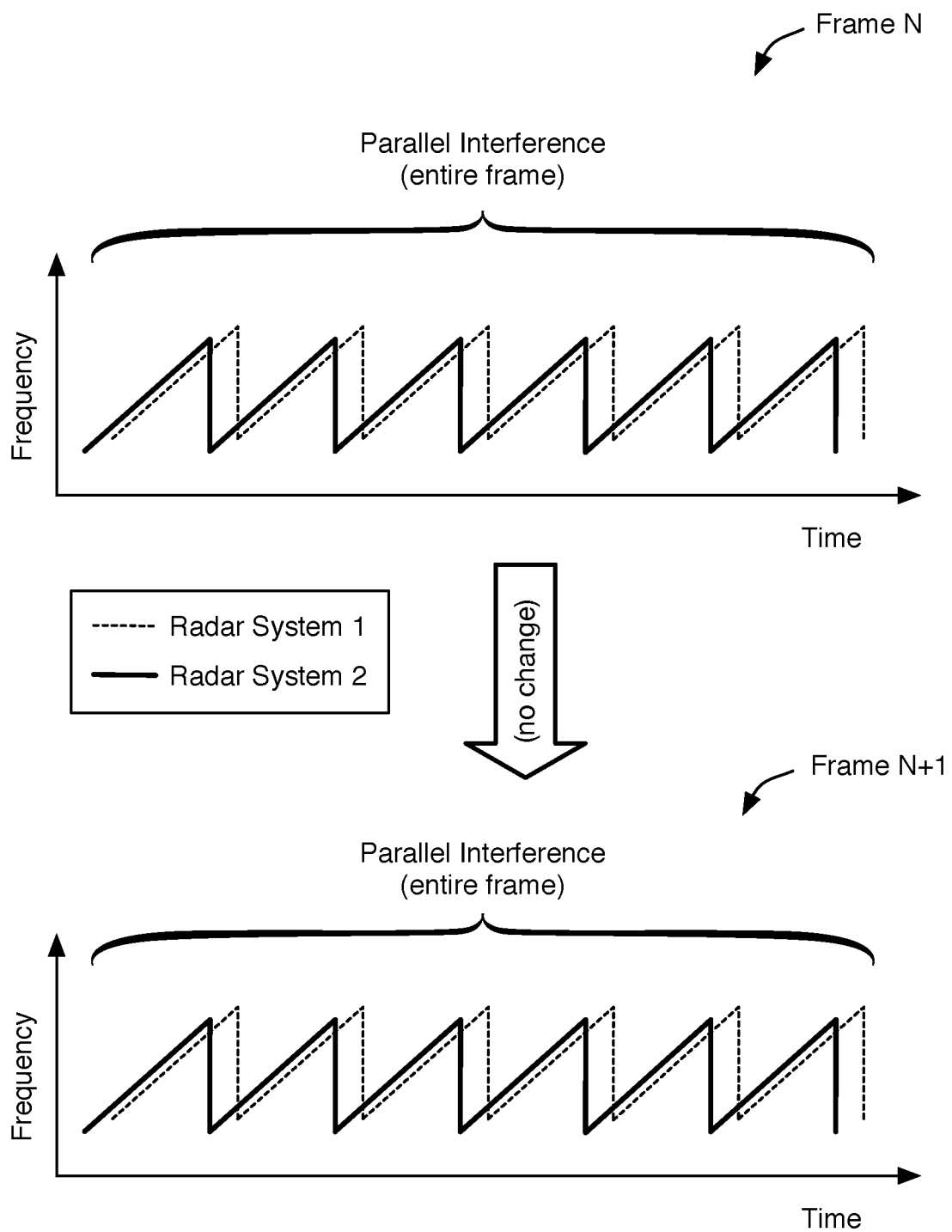
FIGS. 3C-3F are schematic representations of various examples of parallel interference between chirp profiles.
Figure 4A:
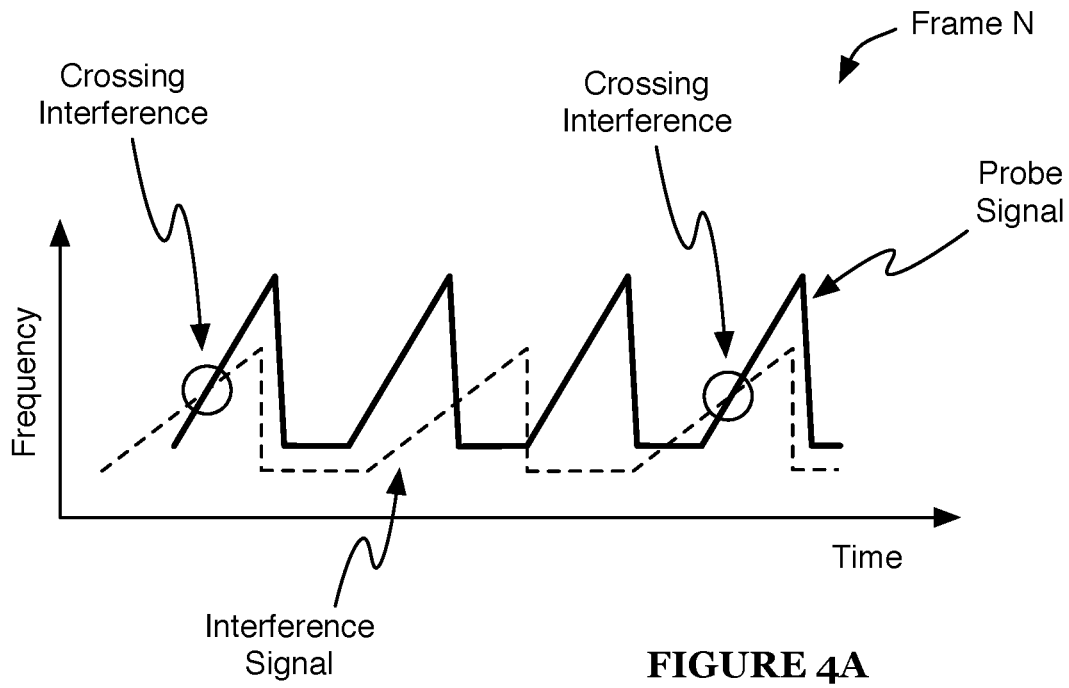
FIGS. 4A-4D are schematic representations of various examples of chirp profiles in the presence of an example interference signal.
Figure 4B:
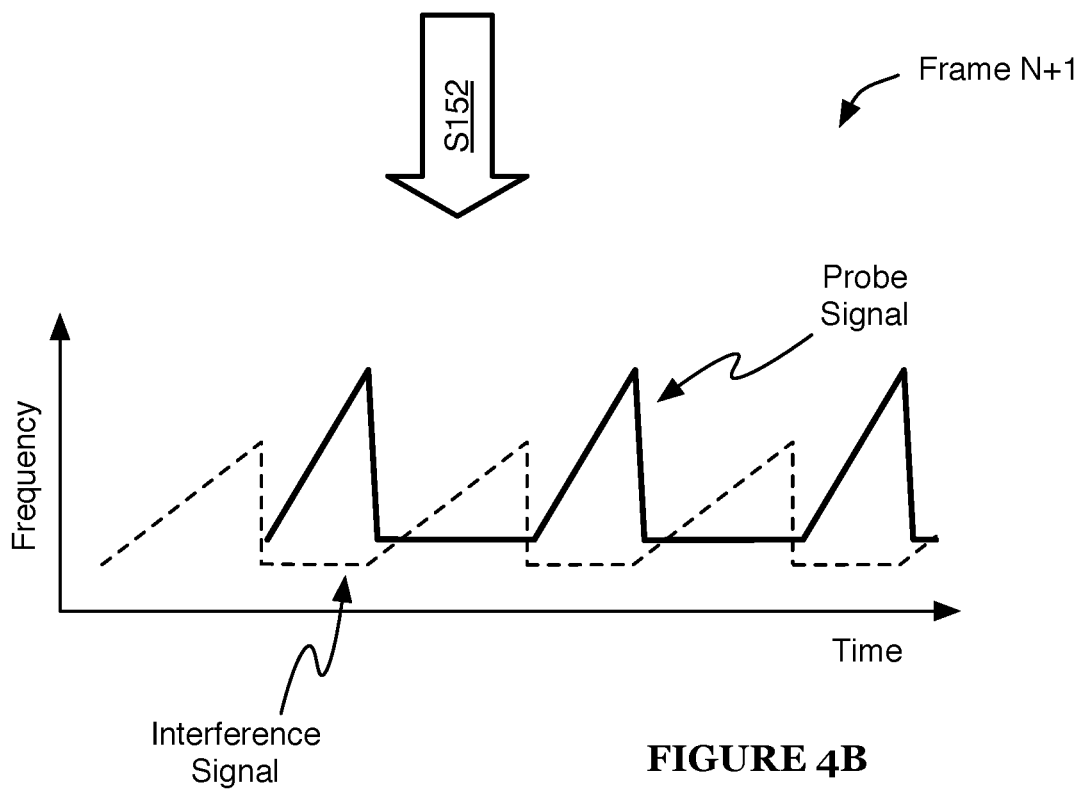
Figure 4C:
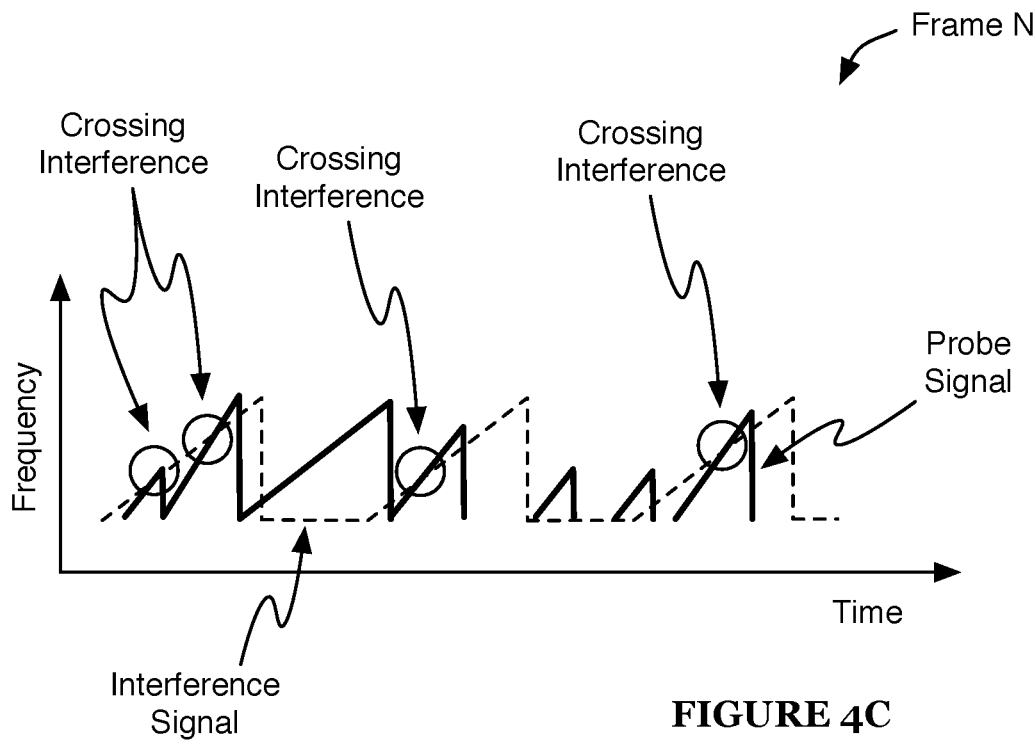

These interference effects can include, in some examples, noise, crossing interference, and/or parallel interference. Other radar systems introducing noise can increase the overall noise from which signals must be discriminated, thereby reducing a radar system's ability to detect lower-intensity signals. Crossing interference (e.g., as shown in FIGS. 4A, 4C, and/or 5B, and/or as described below in more detail), wherein the interference signal crosses the desired signal in frequency, momentarily overlapping it, can result in loss of some information, such as information from the individual probe signals (e.g., chirps and/or other waveforms) that temporally overlap the crossing interference. Parallel interference (e.g., as shown in FIG. 3C), wherein the interference signal is parallel (or substantially parallel) to the desired signal in RF frequency-time space, can result in loss (e.g., complete loss) of information from many probe signals, such as an entire frame (i.e., series of chirps) or multiple frames, as the parallel interference can be present throughout all of the probe signals. This entire-frame parallel interference can arise in situations in which multiple radar systems use the same (or similar) chirp periodicity with overlapping frequency ranges, thereby creating the possibility that the two chirp patterns will remain substantially overlapped (in RF frequency-time space). Accordingly, although any interference is typically undesirable, parallel interference can be especially detrimental to radar system performance.

In some examples, the probability $P_{intf}$ of encountering parallel interference (e.g., unrecoverable parallel interference of at least a threshold strength) at a typical radar system can be described as $1-(1-t_d/t_c)^{N_r-1}$, wherein $t_d$ is a temporal chirp 'jitter' delay (e.g., maximum temporal modulation delay imposed on a chirp), $t_c$ is the chirp periodicity (e.g., time between beginning transmission of one chirp and beginning transmission of the subsequent chirp), and $N_r$ is the total number of radar systems within interference range (e.g., close enough to the radar system in question that their signals can present interference of significant strength), scaled by the transmission duty cycle of those radar systems (and, in circumstances in which the range of transmission frequencies of these radar systems do not fully overlap the radar system in question, scaled by the fractional overlap between the two). Thus, for a large number of radar systems, the probability of unrecoverable parallel interference can be untenably high (e.g., for 500 radar systems operating at a 10% duty cycle, approximately a 40% chance of unrecoverable parallel interference).

In contrast, embodiments of the system 200 and/or method 100 for radar interference mitigation described herein can confer several benefits with respect to mitigating the potential effects of interference.

First, some embodiments can operate such that the probability, duration, and/or severity of interference effects is likely to be significantly reduced as compared with typical radar systems. For example, some such embodiments can operate such that there is zero (or substantially zero) probability of parallel interference across an entire frame, and/or such that the probability of parallel interference for more than a threshold number of chirps (e.g., threshold number of consecutive chirps, threshold total number of affected chirps within a frame, etc.) is zero, substantially zero, and/or significantly reduced as compared with typical radar systems. In some examples, variations in chirp properties (e.g., frequency, slope magnitude and/or sign, timing, phase modulation, etc.) can prevent such long-term (e.g., entire frame, multi-chirp, etc.) parallel interference, such as by ensuring that the chirp pattern does not match the pattern of any other radar system concurrently transmitting, whether the other radar systems include radar systems transmitting substantially fixed chirps (e.g., as shown in FIG. 3D), other radar systems transmitting chirps having varying properties (e.g., as shown in FIGS. 3E-3F), and/or any other suitable radar systems (and/or other sources of potential RF interference).

Second, although crossing interference may be possible (or even occur at increased probability relative to traditional radar systems) for some embodiments, some such embodiments can be configured to detect such interference and/or to correct for information lost (and/or spurious information generated, such as information indicative of the presence of objects that do not actually exist) due to such interference (e.g., as described below in more detail regarding S151). For example, some such embodiments can be configured to detect, remove, and/or replace data affected by crossing interference (e.g., replacing the data based on supplemental data from other chirps, such as chirps within the same frame and/or from previous frames, which may be enabled by the diverse modulation of chirp properties).

Third, some such embodiments can be configured to adaptively avoid such interference (e.g., in response to interference detection), such as by altering chirp properties (e.g., for future frames) to avoid or reduce crossing interference (e.g., as described below in more detail regarding S152). For example, the timing of future chirps can be altered (e.g., by small changes in delay timing between chirps) in order to reduce crossing interference events.

Further, some embodiments can implement advanced 'A.I.' techniques that can greatly enhance radar performance (e.g., with respect to interference mitigation, resolution, latency, overall performance, etc.), as compared with comparable hardware (e.g., hardware having similar complexity, bill of materials, and/or cost, etc.) implementing more traditional radar techniques.

However, the system 20 and/or method 10 can additionally or alternatively confer any other suitable benefits.

2. System.

Figure 2A:
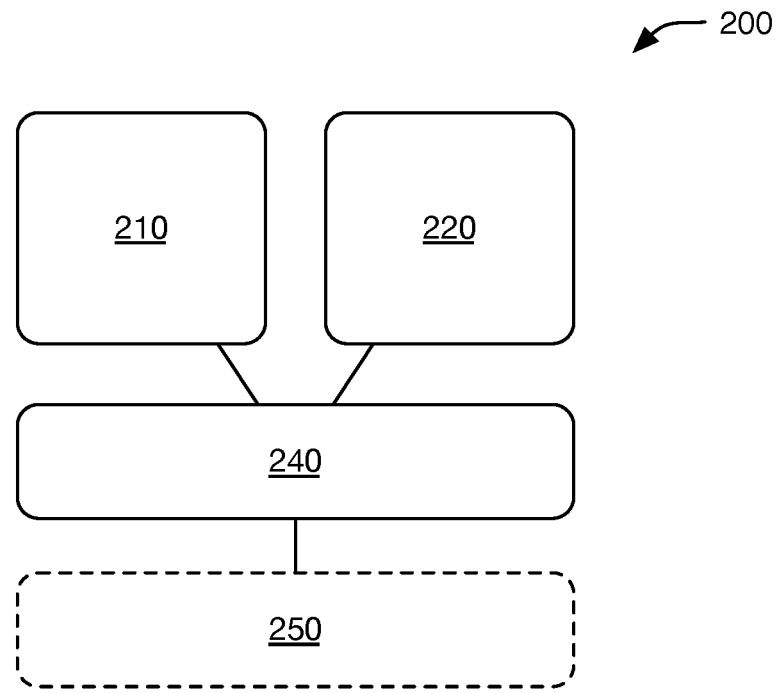
FIG. 2A is a schematic representation of an embodiment of the system.
Figure 2B:
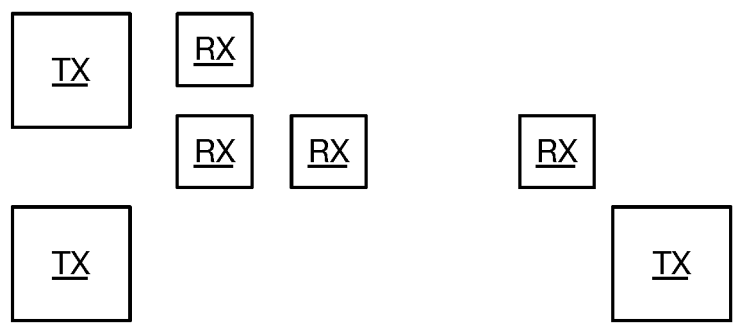
FIG. 2B is a schematic representation of an example of transmitter and receiver arrays of the system.

A system 200 for radar interference mitigation preferably includes one or more transmitter arrays 210, receiver arrays 220, and signal processors 240 (e.g., as shown in FIGS. 2A-2B). The system 200 can additionally or alternatively include one or more velocity sensing modules 250. In some examples, the system 200 includes one or more elements such as described in U.S. patent application Ser. No. 16/704, 409, filed 5 Dec. 2019 and titled "Systems and Methods for Interpolated Virtual Aperture Radar Tracking", U.S. patent application Ser. No. 17/125,122, filed 17 Dec. 2020 and titled "Systems and Methods for Phase-Modulated Radar Detection", and/or U.S. patent application Ser. No. 17/117, 960, filed 10 Dec. 2020 and titled "Systems and Methods for Virtual Doppler and/or Aperture Enhancement", each of which is herein incorporated in its entirety by this reference (e.g., such as described regarding the system 200 of U.S. patent application Ser. No. 16/704,409, U.S. patent application Ser. No. 17/125,122, and/or U.S. patent application Ser. No. 17/117,960). In some examples, the system implements advanced 'A.I.' techniques that can greatly enhance radar performance, as compared with comparable hardware (e.g., hardware having similar complexity, bill of materials, and/or cost, etc.) implementing more traditional radar techniques.

The transmitter array 210 preferably functions to transmit a signal that, after reflection by a target, can provide information about the target (e.g., relative location, velocity, etc.). The transmitter array 210 preferably transmits a frequency shift keyed (FSK) RADAR signal or a frequency-modified continuous wave (FMCW) RADAR signal, but the transmitter array 210 can additionally or alternatively transmit other electromagnetic signals (e.g., radio waves for RADAR; infrared, visible, and/or UV waves for LIDAR; etc.), sound signals (e.g., for SONAR), and/or any other suitable signals.

The transmitter array 210 preferably includes a plurality of transmitter elements (e.g., transmitter antennas). These elements can include: a single transmitter paired to multiple antennas, such as antennas spaced in a particular pattern and/or with antennas coupled to phase shifters and/or time delays; multiple transmitters, each paired to a single antenna; multiple transmitters, some or all paired to multiple antennas (e.g., as described above regarding the single transmitter), with the remaining transmitters preferably each paired to a single antenna; and/or any other suitable transmitter configurations. For example, a transmitter 210 may include transmitter elements spaced by a distances substantially greater (e.g., greater by more than a threshold factor, such as more than 2, 2.5, 3, 4, 5, or 10 times greater) than a distance between receiver elements (e.g., distance between closest receiver elements, average distance between neighboring receiver elements, etc.).

One or more of the transmitter elements (preferably each transmitter element of the system) can include (e.g., be associated with) one or more phase control elements. In some embodiments, the phase control elements include one or more phase inverters (e.g., configured to controllably impose a 180° phase shift on a transmitter signal). The phase control elements can additionally or alternatively include one or more phase shifters (e.g., configured to control a phase shift imposed on the transmitter signal within a phase shifter range, such as ±5°, 10°, 30°, 90°, or 180°, etc.). Although the phase shifter is preferably configured to impose phase shifts substantially independent of frequency, the phase control elements can additionally or alternatively include delay elements (e.g., delay lines) and/or any other suitable elements that impose a frequency-dependent phase shift. Additionally or alternatively, the phase control elements can include elements configured to change one or more aspects of the signal driving the transmitter, such as chirp bandwidth, start and/or end frequency (e.g., lowest or highest frequency of a chirp), idle time, and/or any other suitable aspects (e.g., aspects that will result in a phase shift).

The receiver array 220 preferably functions to receive reflections of the probe signal(s) transmitted by the transmitter 210. The receiver array 220 preferably determines phase, magnitude, and/or frequency information from reflected probe signals, but the receiver array 220 can additionally or alternatively determine any available characteristics of the reflected probe signals.

The receiver array 220 preferably includes a plurality of receiver elements 221 (e.g., receiver antennas), more preferably including a set of receiver elements 221 arranged in a pattern (e.g., along a horizontal or vertical axis, within a plane, etc.). The set of receiver elements 221 can include a single receiver paired to multiple antennas, such as antennas spaced in a particular pattern and/or with antennas coupled to phase shifters and/or time delays; multiple receivers, each paired to a single antenna; multiple receivers, some or all paired to multiple antennas (e.g., as described above regarding the single receiver), with the remaining receivers preferably each paired to a single antenna; and/or any other suitable receiver configurations.

Figure 8A:
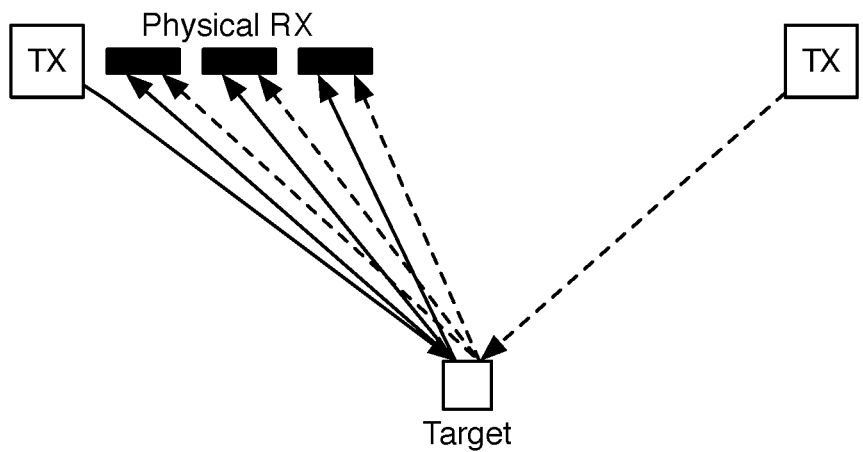
FIGS. 8A-8C are schematic representations of a first example of virtual aperture radar tracking, depicting a physical aperture, a pre-interpolation virtual aperture, and a post-interpolation virtual aperture, respectively.
Figure 8B:
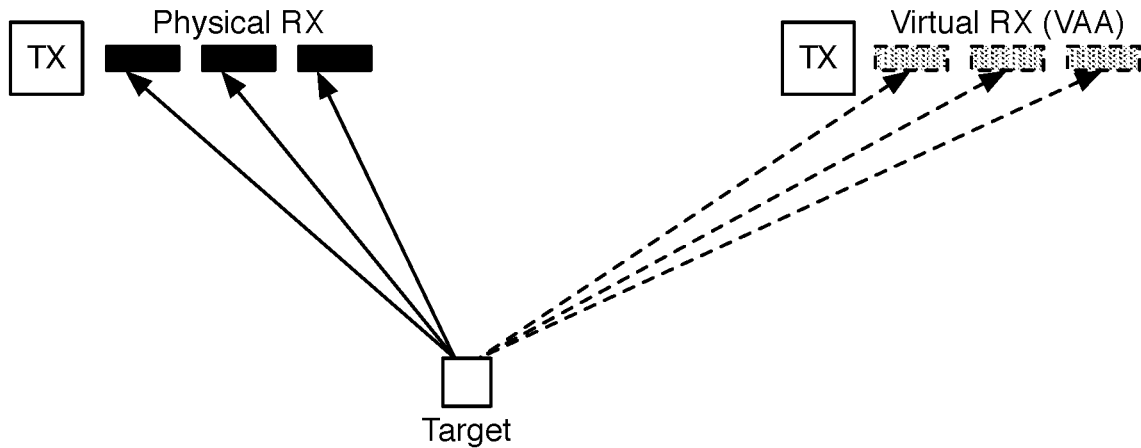
Figure 8C:
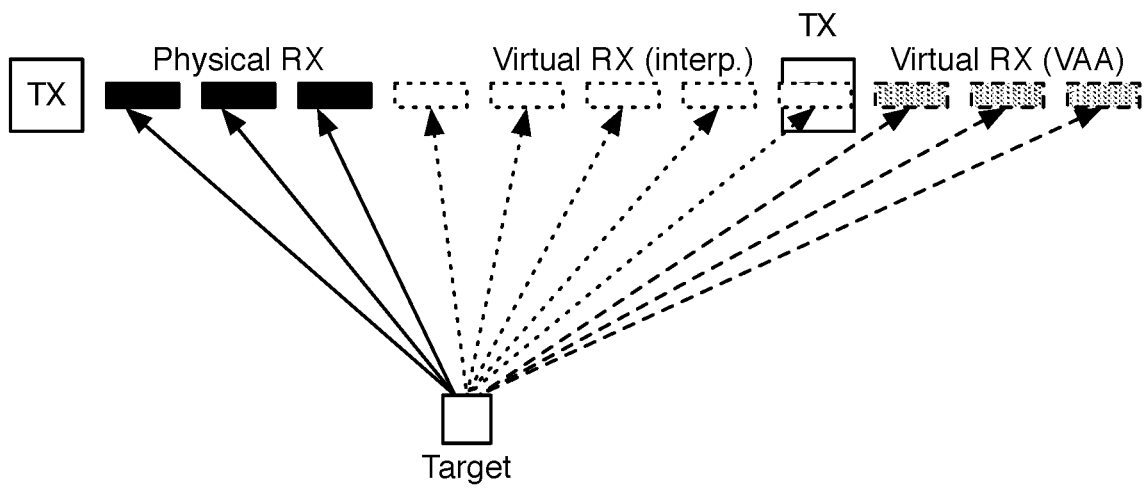
Figure 9A:
FIGS. 9A-9C are schematic representations of a second example of virtual aperture radar tracking, depicting a physical aperture, a pre-interpolation virtual aperture, and a post-interpolation virtual aperture, respectively.
Figure 9B:
Figure 9C:
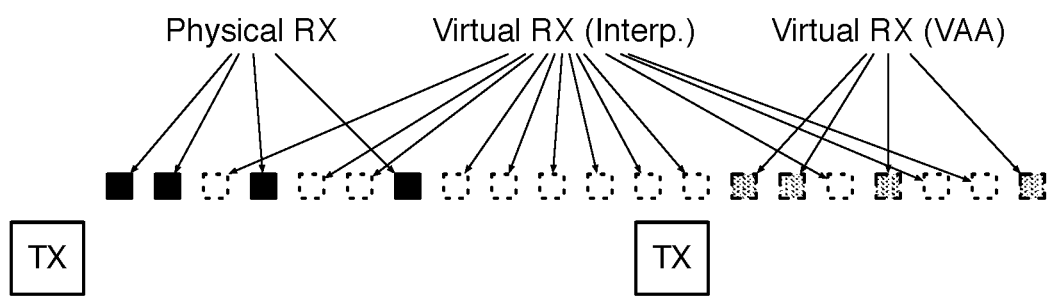
Figure 10A:
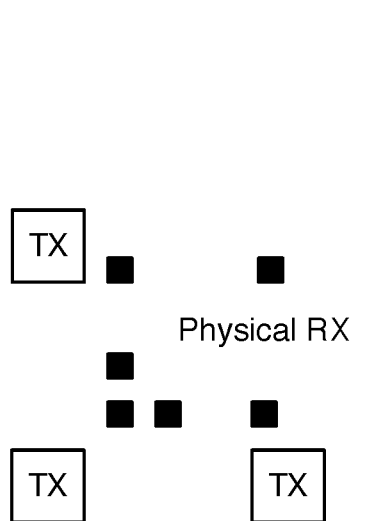
FIGS. 10A-10C are schematic representations of a third example of virtual aperture radar tracking, depicting a physical aperture, a pre-interpolation virtual aperture, and a post-interpolation virtual aperture, respectively.
Figure 10B:
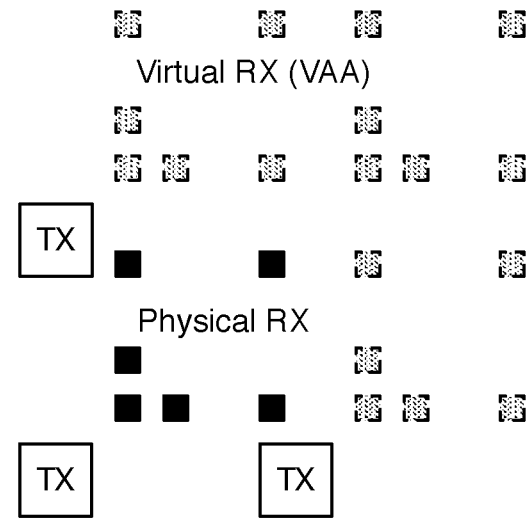
Figure 10C:
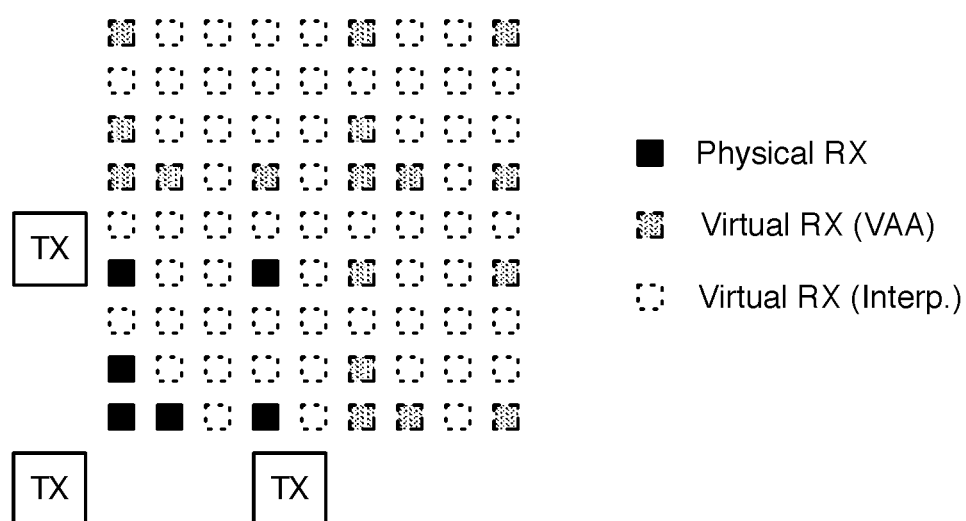
Figure 11A:
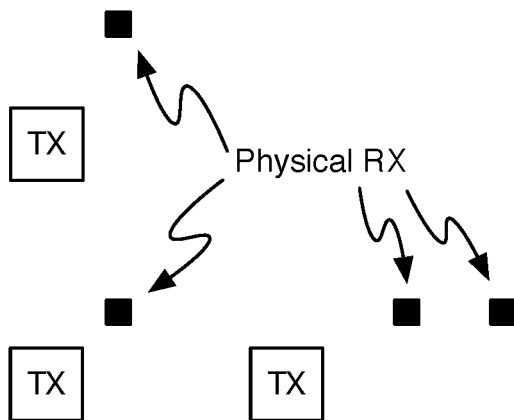
FIGS. 11A-11B are schematic representations of a fourth example of virtual aperture radar tracking, depicting a physical aperture and a post-interpolation virtual aperture, respectively.
Figure 11B:
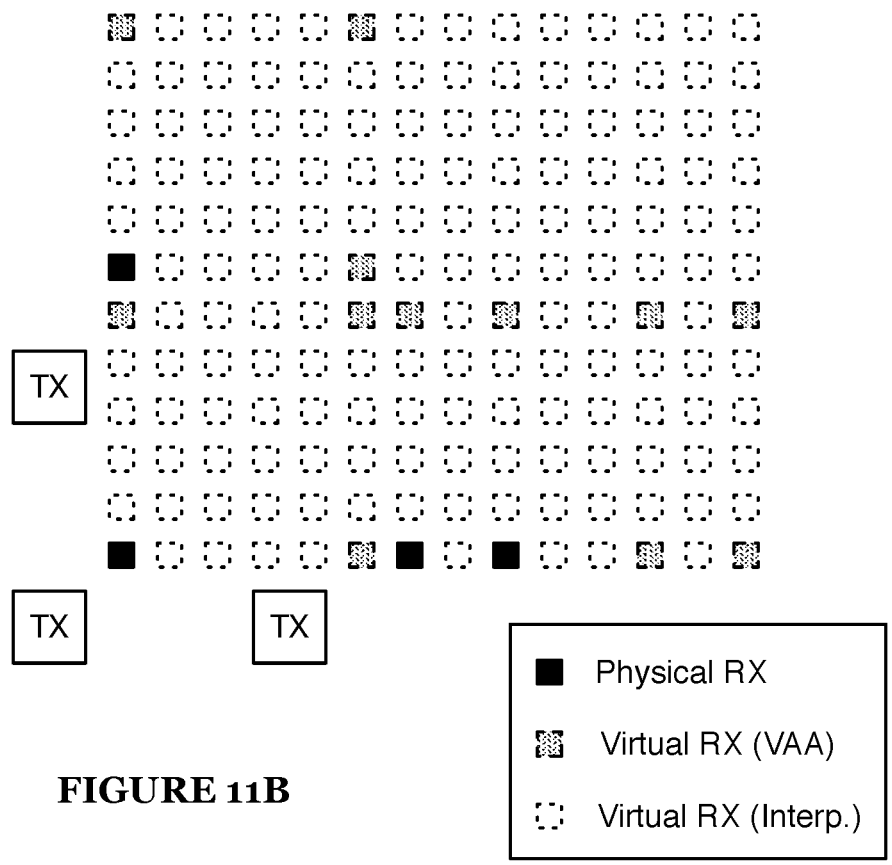
Figure 12A:
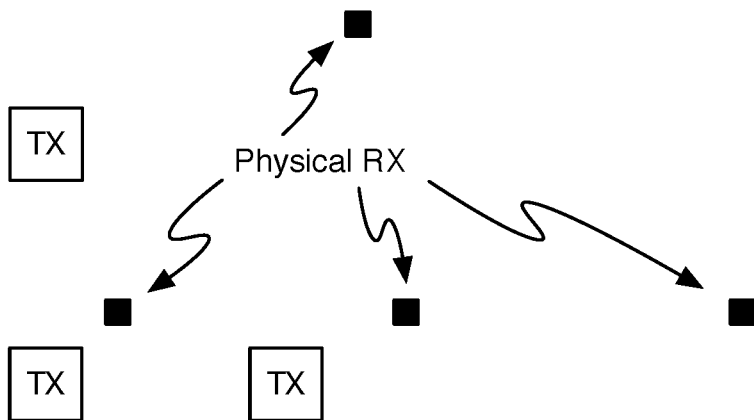
FIGS. 12A-12B are schematic representations of a fifth example of virtual aperture radar tracking, depicting a physical aperture and a post-interpolation virtual aperture, respectively.
Figure 12B:
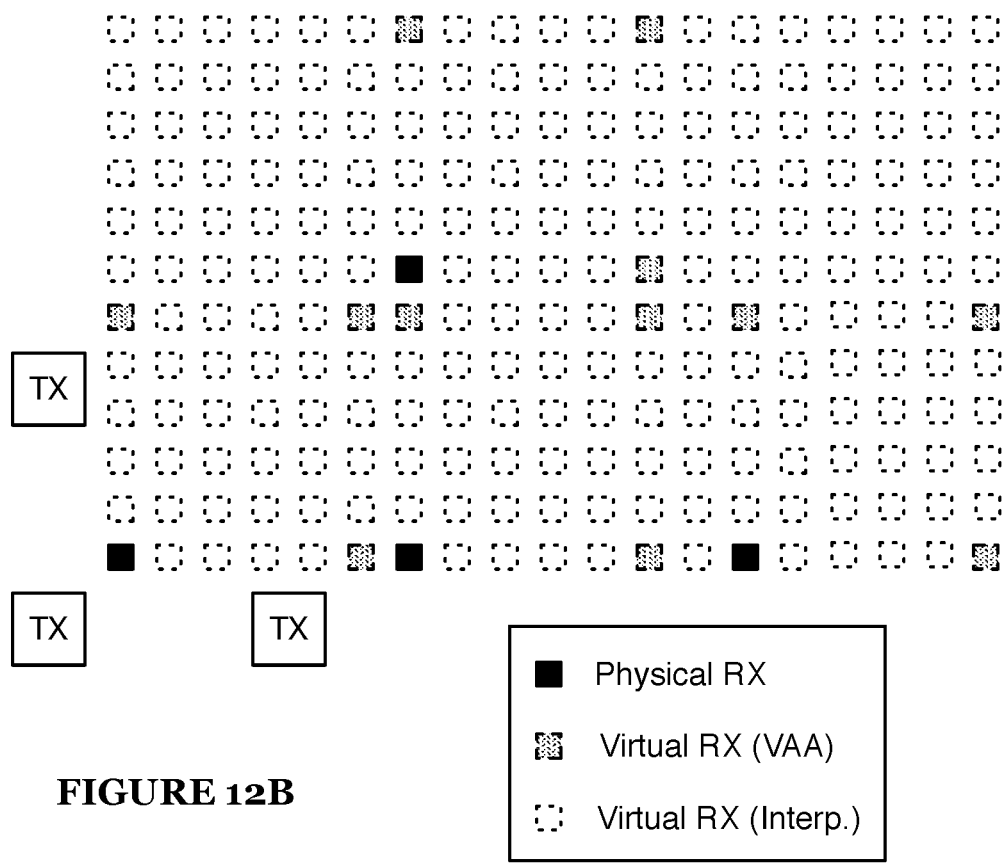
Figure 13A:
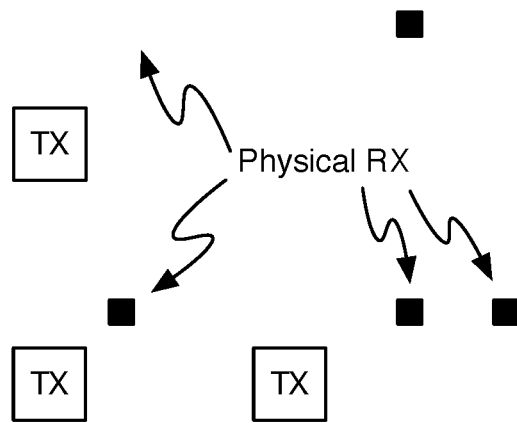
FIGS. 13A-13B are schematic representations of a sixth example of virtual aperture radar tracking, depicting a physical aperture and a post-interpolation virtual aperture, respectively.
Figure 13B:
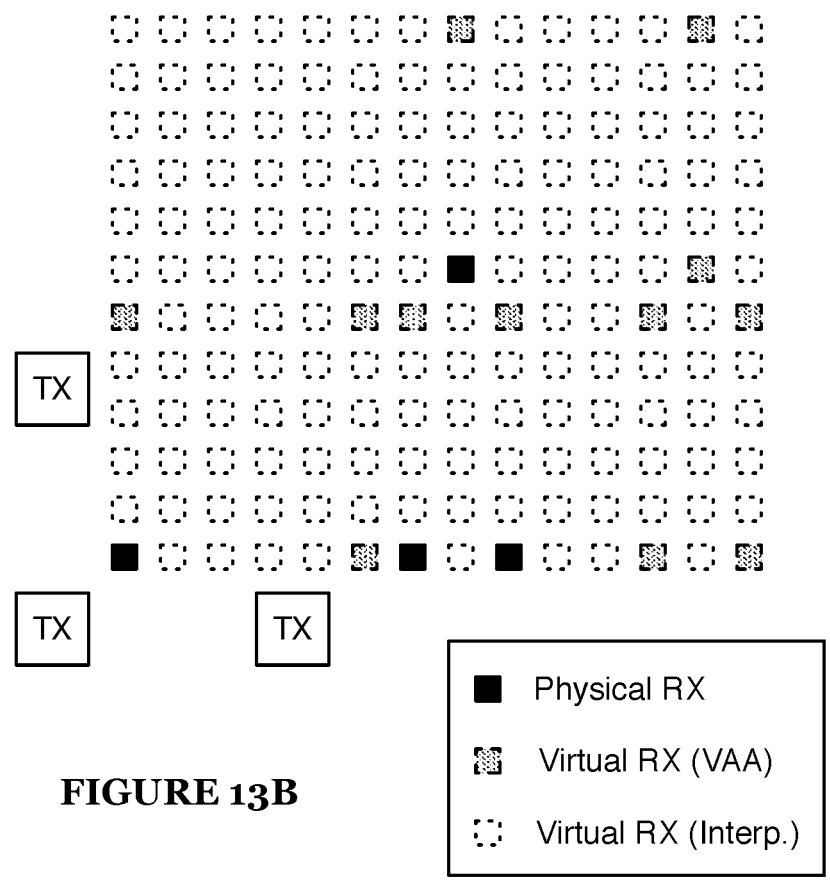

For each array (e.g., each transmitter array 210 and/or each receiver array 220), some or all element pairs (e.g., pairs of transmitter antennas for the transmitter array, pairs of receiver antennas for the receiver array) preferably have a spacing substantially equal to (and/or less than) $\lambda/2$ (wherein $\lambda$ is the radio wavelength transmitted by the transmitters). This $\lambda/2$ spacing can be a spacing between physical elements (e.g., as shown in FIGS. 8A, 9A, and/or 10A), between a physical element and a virtual (e.g., VAA/MIMO) element (e.g., as shown in FIGS. 11B, 12B, and/or 13B; wherein analysis techniques such as described below regarding S130 can be used to achieve alignment between such elements), between virtual elements, and/or between any other suitable elements. In examples in which the array is multidimensional (e.g., planar, including both horizontal and vertical elements, etc.), the array preferably includes, for each dimension of the array (e.g., for a planar array, horizontal and vertical), one or more element pairs with a $\lambda/2$ spacing along that dimension; such pairs are more preferably substantially aligned along the other dimension(s) (e.g., as shown in FIGS. 10A, 11B, and/or 12B), but can additionally or alternatively include pairs with a $\lambda/2$ spacing along multiple dimensions (e.g., as shown in FIG. 13B) and/or with any other suitable spacing along the other dimension(s). However, the arrays can additionally or alternatively include elements with any other suitable spacing. The elements of some or all of the arrays can be arranged in linear (or substantially linear) arrangements, arranged in planar (or substantially planar) arrangements, arranged substantially along a surface (e.g., cylindrical surface, spherical surface, conical surface, etc.), arranged throughout a volume, and/or have any other suitable arrangement. The transmitter and receiver arrays (and/or aspects thereof, such as primary axes, etc.) can be arranged linearly, orthogonally, parallel, at oblique angles, skew, co-planar, and/or have any suitable arrangement relative to each other. Some example arrangements are shown in FIGS. 6, 7, 8A, 9A, 10A, 11A, 12A, and 13A.

The arrangement of the transmitter and receiver arrays (e.g., direction and/or distance between the different transmitters and/or receivers) is preferably known. The arrangement is preferably fixed (or substantially fixed), such as wherein the transmitters and receivers of the arrays are rigidly coupled to each other. However, the arrangement can alternatively be changeable and/or changing. In some embodiments, different sets of receivers can be associated with each transmitter. The sets can be overlapping sets, disjoint sets, or have any other suitable relationship. In some such embodiments, the different sets of receivers can move independently from each other (e.g., wherein the arrangement of receivers within a set is fixed, but the arrangement of the different sets with respect to one another can vary). However, the transmitters and/or receivers can additionally or alternatively define any other suitable spatial arrangements.

The signal processor 240 preferably functions to analyze information received from other elements of the system 200, such as information determined, sampled, and/or otherwise collected by the transmitter array 210, receiver array 220, and/or velocity sensing module 250. The signal processor can additionally or alternatively function to control configuration and/or operation of one or more elements of the system 200. In examples, the signal processor 240 can: control transmission and/or receipt of probe signals (e.g., as described below regarding S110 and/or S120), decode and/or store received probe signals (e.g., as described below regarding S130), evaluate interference (e.g., as described below regarding S140), correct collected data (e.g., as described below regarding S151), control probe signal modification (e.g., as described below regarding S152), calculate tracking parameters (e.g., as described in U.S. patent application Ser. No. 16/704,409, filed 5 Dec. 2019 and titled "Systems and Methods for Interpolated Virtual Aperture Radar Tracking", which is herein incorporated in its entirety by this reference, such as described in U.S. patent application Ser. No. 16/704,409 regarding calculating initial tracking parameters S130, refining the initial tracking parameters S140, and/or modifying probe signal characteristics S150; etc.), perform any other suitable elements described below regarding the method 100, and/or perform any other suitable functions (e.g., any other computing and/or processing functions).

The signal processor 240 preferably includes a one or more processors (e.g., CPU, GPU, microprocessor, microcontroller, FPGA, ASIC, etc.) and/or storage units (e.g., Flash, RAM, magnetic disk drive, etc.), but can additionally or alternatively include any other suitable elements. However, the signal processor 240 can additionally or alternatively perform its functions in any other suitable manner. The signal processor 240 can additionally or alternatively be used to communicate with an external computer (e.g., to offload computations, receive additional data, and/or for any other suitable reason). However, the system 200 can additionally or alternatively include any other suitable signal processor(s) 240.

The velocity sensing module 250 preferably functions to determine (e.g., measure, estimate, receive information indicative of, etc.) the velocity ("egovelocity") of the system 200 (and/or of one or more elements of the system 200, such as the transmitter and/or receiver arrays; and/or one or more objects coupled to the system 200; etc.). In some embodiments, the velocity sensing module includes and/or receives information indicative of velocity from one or more sensors (e.g., wherein the velocity sensing module includes one or more communications interfaces that receive information from the sensor(s)). The sensors can include spatial sensors (e.g., inertial measurement sensors, accelerometer, gyroscope, altimeter, magnetometer, etc.), location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), speed sensors (e.g., pitot probes, wheel speed sensors, etc.), and/or any other suitable sensors. The communications interfaces can include Wi-Fi, Bluetooth, Ethernet, ODB-II, CAN bus, and/or any other suitable wired and/or wireless communication interfaces.

Some or all elements of the system 200 can include one or more aspects (e.g., sub-elements, configurations, functionalities, arrangements, etc.) such as described in U.S. patent application Ser. No. 16/704,409, filed 5 Dec. 2019 and titled "Systems and Methods for Interpolated Virtual Aperture Radar Tracking", which is herein incorporated in its entirety by this reference. However, the system 200 can additionally or alternatively include any other suitable elements in any suitable arrangement.

In some examples, the system 200 may be located near other radar systems (e.g., other similarly-configured radar systems, more typical radar systems, etc.). For example, the system 200 may be located close enough to these other systems that there is potential for interference between the systems (e.g., wherein probe signals transmitted by one radar system are received by another radar system, thereby creating interference that the receiving radar system must discriminate from the signals it is intended to receive). In some such examples, one or more techniques, such as those described below regarding the method 100 for radar interference mitigation, may be implemented (e.g., by the system 200) to reduce the negative impacts of this interference on system performance (e.g., on the ability of the system 200 to determine information about the environment surrounding it based on reflected radar probe signals). However, the system 200 may additionally or alternatively have any other suitable arrangement with respect to other radar systems and/or may be arranged near any other suitable systems.

3. Method.

Figure 1:
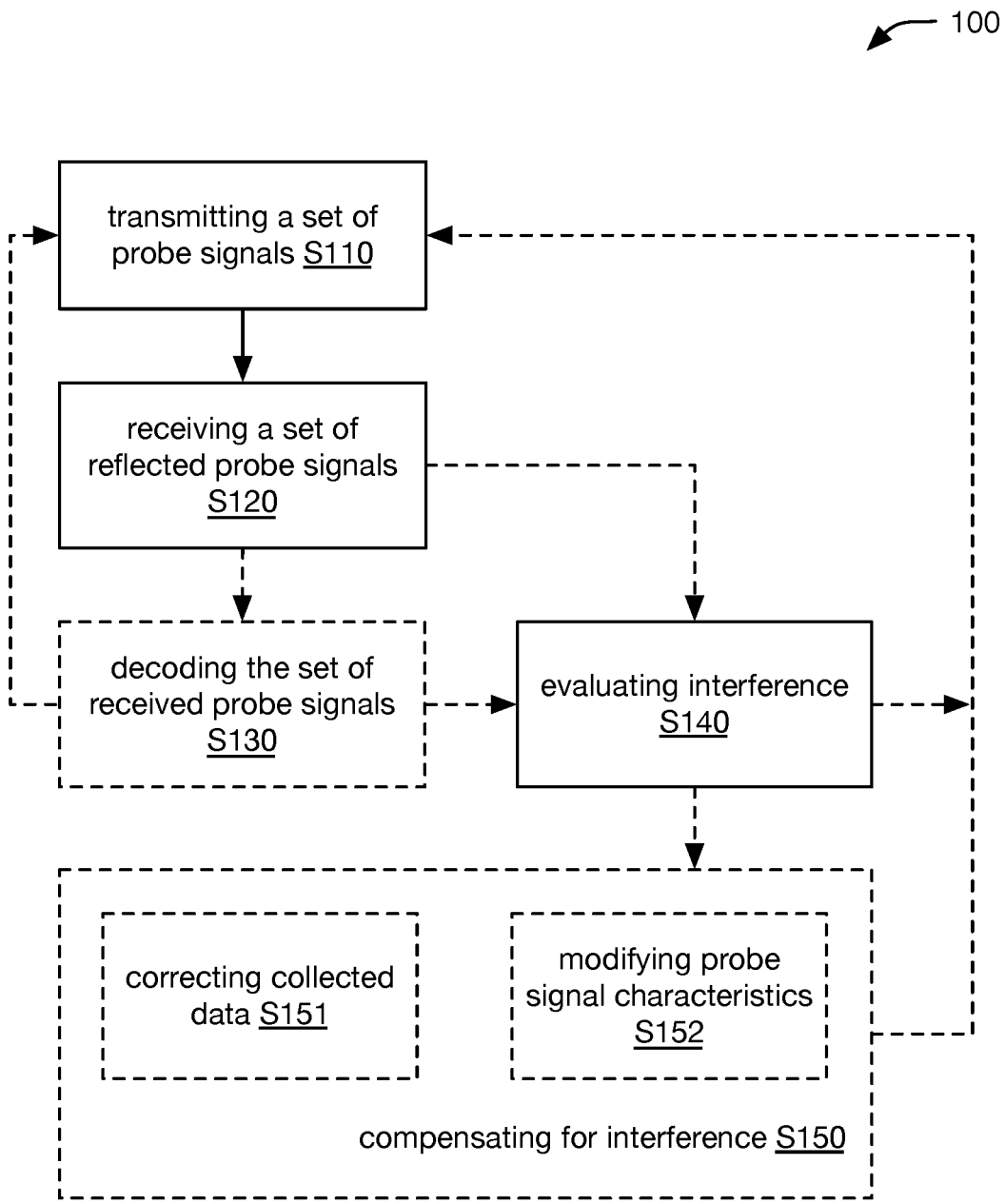
FIG. 1 is a schematic representation of an embodiment of the method.

A method 100 for radar interference mitigation preferably includes: transmitting a set of probe signals S110, receiving a set of reflected probe signals S120, and/or evaluating interference S140 (e.g., as shown in FIG. 1). The method can additionally or alternatively include decoding the set of received probe signals S130, compensating for interference S150, and/or any other suitable elements. The method preferably functions to mitigate the effects of interference on radar detection (e.g., radar-based detection of targets within an environment surrounding a system implementing the method). The method 100 is preferably implemented using a radar system (e.g., the system 200 described above), but can additionally or alternatively be implemented using any other suitable wave-based detection system (e.g., sonar system, lidar system, etc.).

3.1 Transmitting a Set of Probe Signals.

Transmitting a set of probe signals S110 preferably functions to transmit signals that, after reflection off of one or more targets, can provide information about those targets (e.g., relative location and/or velocity, etc.). S110 preferably includes transmitting frequency shift keyed (FSK) RADAR signals and/or frequency-modified continuous wave (FMCW) RADAR signals (e.g., defining a plurality of "chirps"). However, S110 can additionally or alternatively include transmitting any other suitable signals. In examples, the signals can include electromagnetic signals (e.g., radio waves in RADAR; infrared, visible, and/or UV light in LIDAR; etc.) and/or sound signals (e.g., as in SONAR). In some embodiments, one or more elements of S110 are performed such as described in U.S. patent application Ser. No. 16/704,409, filed 5 Dec. 2019 and titled "Systems and Methods for Interpolated Virtual Aperture Radar Tracking", which is herein incorporated in its entirety by this reference (e.g., as described in U.S. patent application Ser. No. 16/704,409 regarding transmitting a set of probe signals S110).

In embodiments in which a plurality of chirps are transmitted, each chirp is preferably considered a separate probe signal. However, a probe signal can alternatively include multiple such chirps (e.g., 2, 4, 8, 16, 32, 2-16, 16-64, or more than 64 chirps, etc.), can include only portions of a chirp, and/or can include any other suitable transmitted signal.

The probe signals preferably include an idle time between chirps (e.g., between all consecutive chirps, between any suitable subset of consecutive chirps, etc.). The idle time can be in the range of 5-60% (e.g., 5, 10, 15, 20, 25, 30, 35, 40, 45, 50, 55, 60, 5-15, 10-30, 15-45, and/or 20-60%, etc.), less than 5%, or more than 60% of a characteristic chirp time (e.g., chirp duration, time between subsequent chirp onsets, etc.). In some embodiments, the idle time is a substantially constant duration (e.g., substantially equal idle time between any consecutive chirps). In other embodiments, for example, the idle time can vary, preferably varying between multiples of a minimum idle time, such as 1, 2, 3, 4, and/or 5 times the minimum idle time (and/or any other suitable multiples). In a specific example, the idle time varies between 10%, 20%, and 30% of the chirp duration. The idle time can be varied between each consecutive chirp and/or any suitable subset thereof. In some embodiments, such idle time variations can enable interference compensation (e.g., as described below regarding S152, such as regarding temporal modifications of probe signals). However, the chirps and/or idle times can additionally or alternatively be controlled in any other suitable manner.

In some embodiments, the bandwidth and rate of frequency change (slope) of the chirps is substantially fixed (e.g., constant for all chirps). However, some such embodiments may be especially susceptible to interference from other radio signals (e.g., due to a regular and/or periodic pattern defined by the chirps). Additionally or alternatively, in some such embodiments, it may not be possible to achieve desired performance in terms of one or more of maximum unambiguous range (e.g., typically limited by slope), maximum unambiguous Doppler velocity (e.g., typically limited by chirp duration), and/or range resolution (e.g., typically limited by bandwidth), because the bandwidth, slope, and chirp duration are coupled; an increase in bandwidth (e.g., to increase range resolution) must be accompanied by an increase in slope magnitude and/or chirp duration (e.g., decreasing maximum unambiguous range and/or Doppler velocity). In other embodiments, one or more such characteristics can vary between the chirps. In some such embodiments, these variations can help mitigate the effects of interference from other radio signals (e.g., as described below in more detail). Further, such variations can enable increases in (e.g., via decoupling of limits on) maximum unambiguous range, maximum unambiguous Doppler velocity, and/or range resolution. In examples, one or more of these characteristics can be varied from a reference value (e.g., typical value, average value, first chirp value, minimum or maximum value, etc.) by factors between 0.1 and 10 (e.g., 0.1, 0.2, 0.3, 0.5, 0.75, 1, 1.5, 2, 3, 4, 5, 10, 0.1-0.3, 0.3-0.7, 0.7-1.3, 1.3-3, 3-6, 6-10, etc.), less than 0.1, and/or greater than 10. The characteristic(s) can be changed between each chirp, changed between sets of multiple chirps, and/or changed with any other suitable timing. The characteristic(s) can be different for all chirps (or all chirps from a particular transmitter, such as wherein the same variation pattern is used independently for each transmitter), changed in a fixed pattern, changed in a dynamically-adjusted manner, and/or changed in any other suitable manner.

S110 preferably includes imposing phase variance on some or all of the transmissions, such as described elsewhere in more detail (e.g., regarding the phase modulation encoding and/or the additional phase variance). However, the transmissions can alternatively exhibit no (or substantially no) phase variance.

Figure 3A:
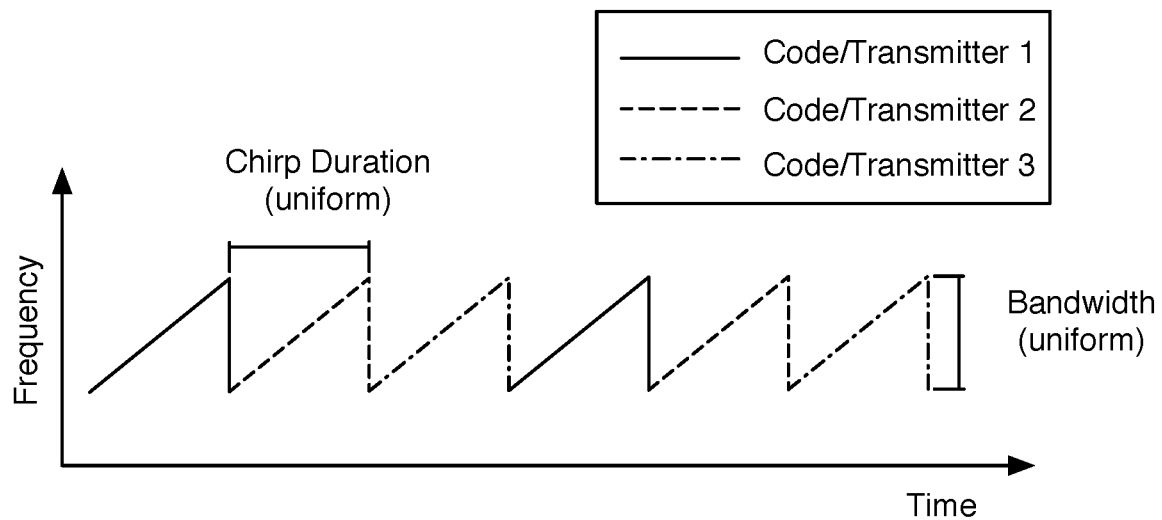
FIGS. 3A-3B are schematic representations of a first and second example of chirp profiles, respectively.
Figure 3B:
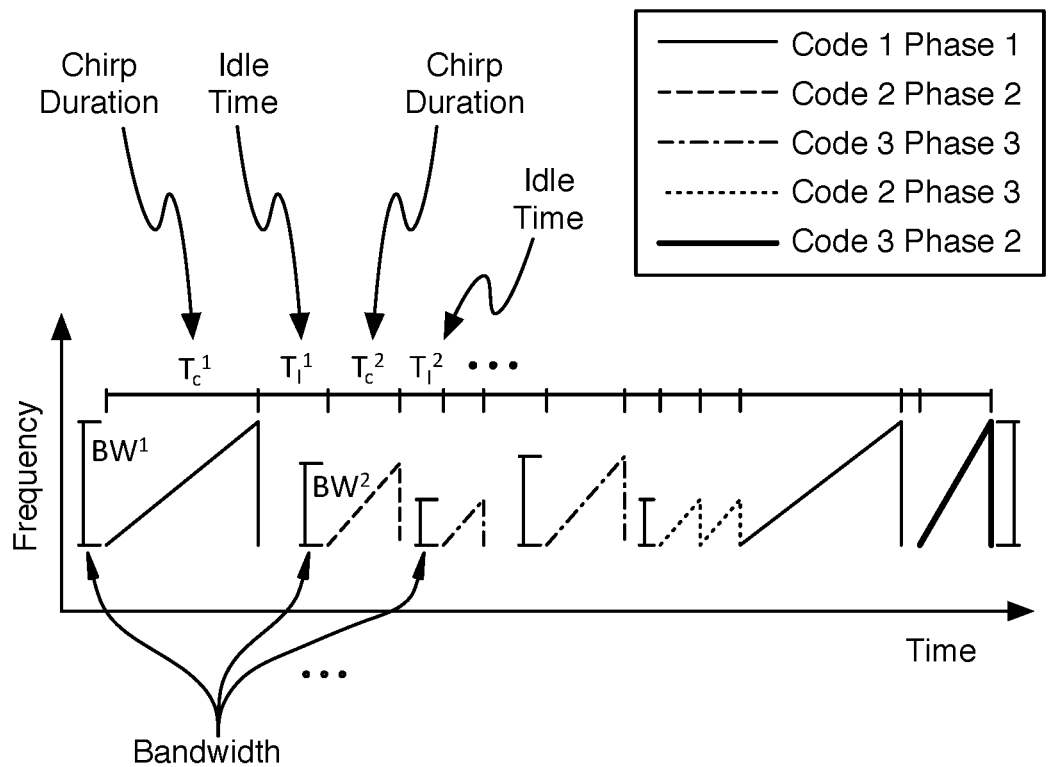
Figure 3D:
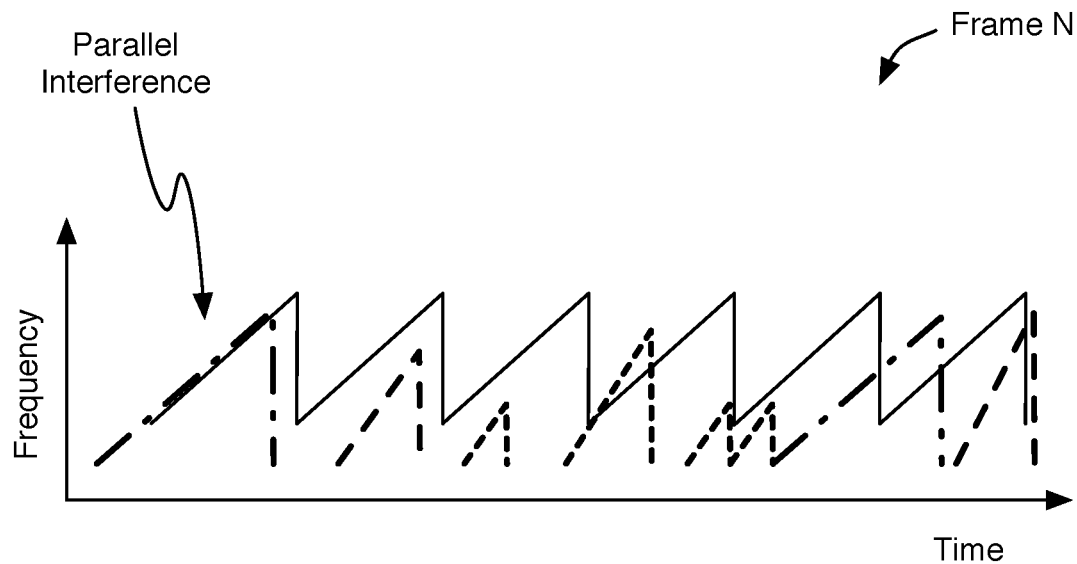
Figure 3D:
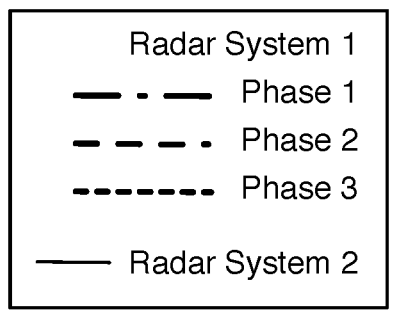
Figure 3D:
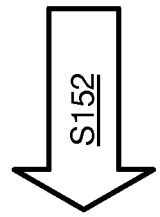
Figure 3D:
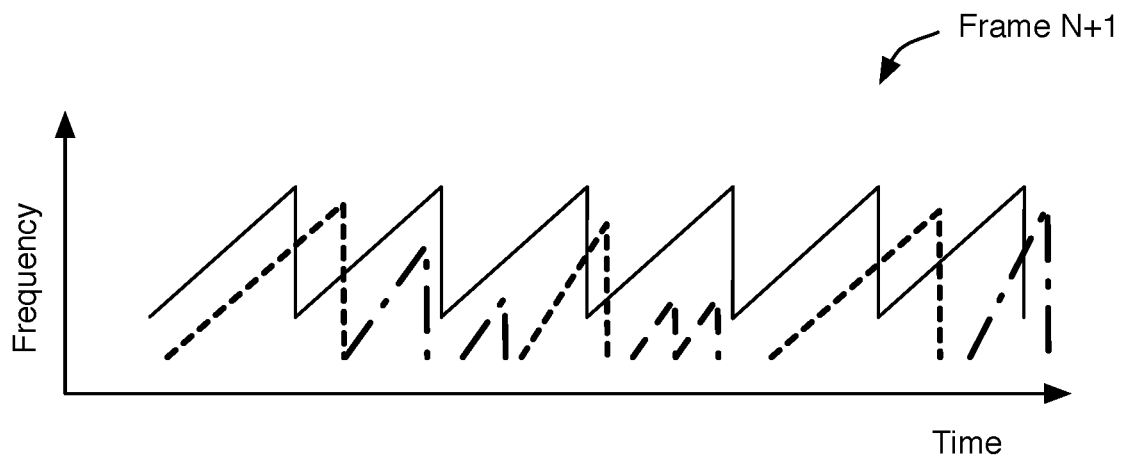
Figure 3E:
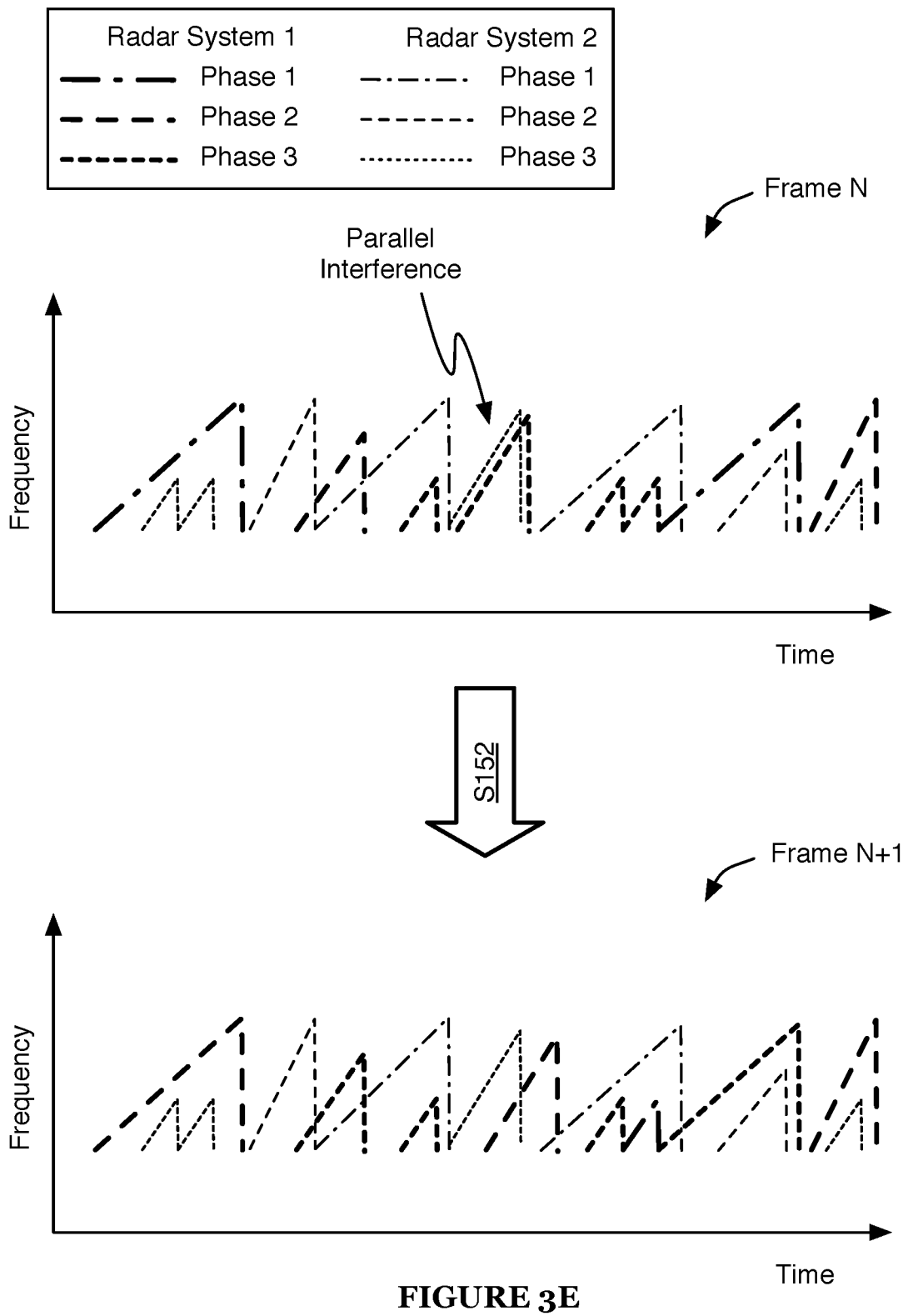
Figure 3F:
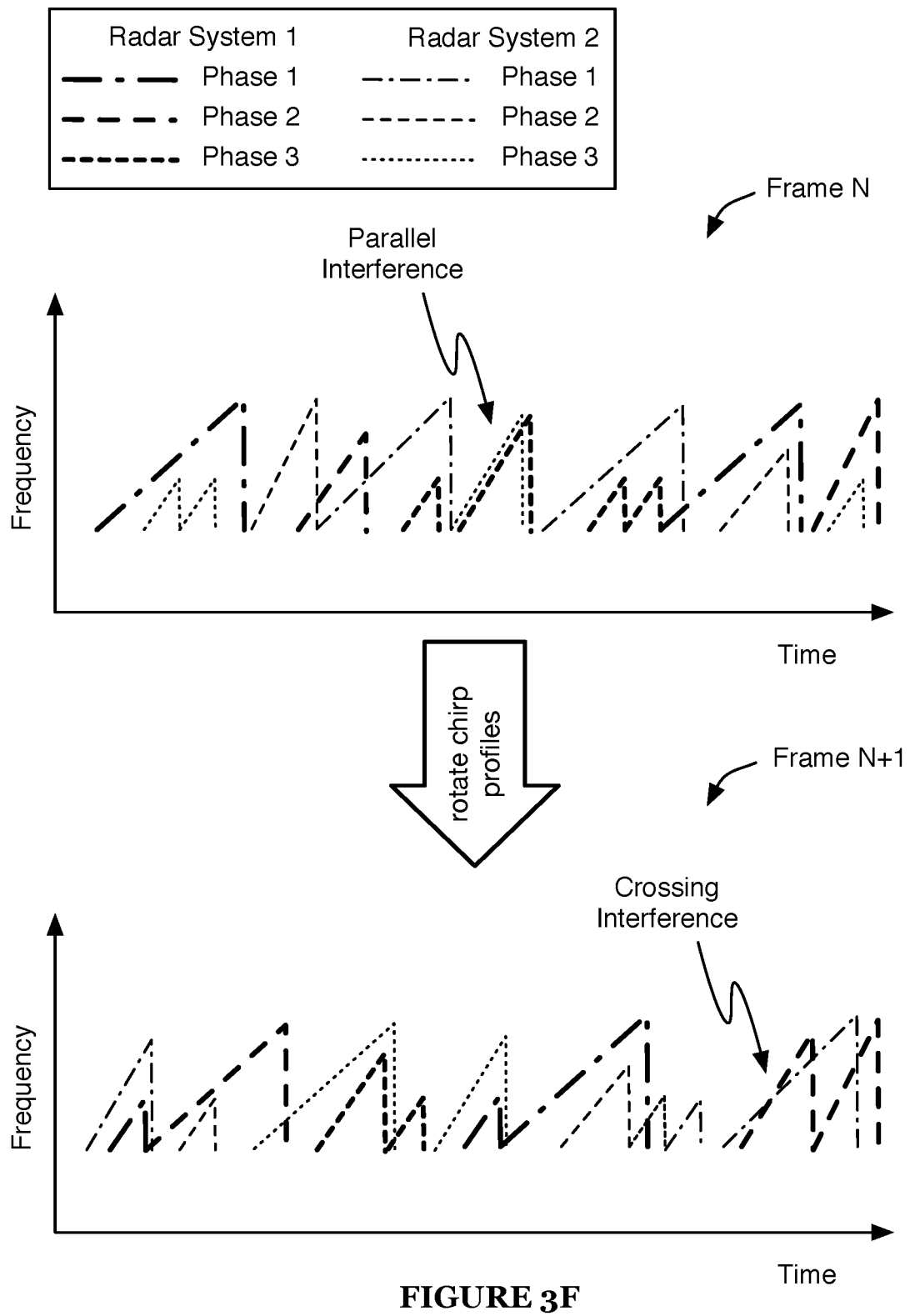

An example of chirps exhibiting substantially no idle times, and with substantially fixed bandwidths, slopes, and phase (optionally with the exception of phase modulation encoding to enable code-division multiplexing, e.g., wherein all transmitters transmit phase-encoded orthogonal chirps concurrently) is shown in FIG. 3A (where the different colors can be understood to represent either transmissions from different transmitters, or transmissions using different orthogonal phase encodings). In contrast, an example of chirps exhibiting varying idle times, bandwidths, slopes, and phase shifts is shown in FIG. 3B, where different orthogonal phase encodings are represented by different colors, and where different additional phase variances are depicted using different line styles; although depicted herein with 3 different phase encodings and 3 different additional phase variances, a person of skill in the art will recognize that the chirps may additionally or alternatively exhibit any other suitable number of phase encodings, additional phase variances, and/or any other suitable aspects. However, the idle times, bandwidths, slopes, and/or phase shifts of the chirps can additionally or alternatively be controlled (e.g., varied) in any other suitable manner.

The transmitted probe signals are preferably grouped into signal groups (e.g., frames). Signals of a signal group are preferably transmitted consecutively (e.g., with substantially no time between signal transmission, with some delay time between signals, etc.). Alternatively, signals of a signal group can be transmitted concurrently, preferably only if the signals are distinguishable, such as distinguishable based on radio frequency (e.g., wherein each signal of the group covers a different, preferably non-overlapping, frequency band). However, the signals can additionally or alternatively be transmitted with any other suitable timing.

Within each signal group, the signals of the group are preferably linearly independent (more preferably substantially orthogonal). Each signal is preferably generated using multiple transmitters (more preferably using all transmitters of the system) transmitting concurrently. However, some or all signals of a group can alternatively be generated by transmission from a single transmitter and/or generated in any other suitable manner.

In some embodiments, the signal groups can be substantially identical to each other (before imposition of additional phase variance such as described below). For example, each signal group can include the same sequence of N orthogonal signals, wherein N is preferably equal to the number of transmitters in the system (and/or the number of transmitters used to generate the signals of the signal group). In other embodiments, signal groups can include the same signals (e.g., N orthogonal signals, any other suitable number and/or type of signals, etc.) but in different orders from each other, and/or can include one or more signals different from signals of the other signal groups. For example, the number and/or characteristics (e.g., temporal characteristics such as order, duration, and/or idle time; phase characteristics such as encoding; spectral characteristics such as frequency, bandwidth, and/or slope; etc.) of the signals can be modified such as described below in more detail (e.g., regarding S152). However, the signal groups can additionally or alternatively include any other suitable signals determined in any suitable manner.

In some embodiments, the signals of a signal group are encoded by phase modulation. For example, each transmitter can concurrently transmit a substantially identical signal, but with some of these signals being phase-shifted relative to others. For example, the signals can be encoded using a binary phase modulation (e.g., imposed using a phase inverter on some or all of the transmitters, wherein some signals of the group are transmitted substantially 180° out of phase with other signals of the group), quaternary phase modulation, any other suitable phase shift keying, and/or any other suitable modulation scheme.

However, the signals can additionally or alternatively have any other suitable relationship, preferably wherein different transmitted probe signals are distinguishable from each other (e.g., based on timing, phase effects, other modulation, etc.).

S110 preferably includes imposing additional phase variance (e.g., in addition to the phase modulation encoding described above) on some or all of the transmitted probe signals. This phase variance preferably includes imposing small phase shifts (e.g., shifts between the different transmitters, shifts with respect to any other suitable phase reference, etc.), such as phase shifts less than a threshold magnitude (e.g., 1, 2, 5, 10, 15, 30, 60, or 90 degrees, etc.). The additional phase variance preferably changes over time (e.g., changing between each chirp, changing between sets of multiple chirps, changing during a chirp such as changing more than once for each chirp, etc.), which can include changing such as describe below in more detail (e.g., regarding S152, such as regarding phase modifications of the probe signals); however, the additional phase variance can alternatively be fixed or substantially fixed. In a first example, the phase shifts correspond (or substantially correspond) to beam steering configurations (e.g., for the phased transmitter array). In this example, the phase variance is controlled within a one- or two-dimensional space (e.g., wherein the one or two free variables of the space are associated with the beam steering heading, such as corresponding to an azimuthal angle and/or an elevation angle). In a second example, arbitrary phase shifts can be imposed, such as wherein, for a system with N transmitters, the phase variance is selected within an N−1 dimensional space (e.g., corresponding to N−1 free variables, associated with each phase shift except for that of one transmitter, which is taken as a zero phase shift reference). In a third embodiment, the phase shifts can include variances selected over any other suitable space (e.g., having dimension greater than two but less than N−1) and/or can include any other suitable phase shifts.

The phase shifts can arise from (e.g., be imposed by) phase shifters, time delay elements (e.g., delay lines), changes to transmitted signal chirp characteristics (e.g., chirp bandwidth, start frequency, idle time, etc.), and/or can arise due to any other suitable effects.

The sequence of phase shifts can be a predetermined sequence, dynamically determined sequence, randomly or pseudo-randomly determined sequence, and/or any other suitable sequence. In some examples, the predetermined sequences can include Gold codes, Kasami codes, Hadamard codes, Zadoff-Chu sequences, complementary sequences, other code sequences with low cross-correlation, and/or any other suitable sequences. However, the phase shifts can additionally or alternatively be selected in any other suitable manner.

The phase shifts imposing the additional phase variance can be changed with each chirp, each signal group, and/or for any other suitable set of signals. The phase shifts are preferably changed with regular timing, but can alternatively be changed sporadically, in response to triggers, and/or with any other suitable timing.

S110 preferably includes transmitting one or more frames of signals, wherein each frame is a collection of (preferably, consecutively-transmitted) probe signals. For example, each frame can include a specific number of probe signals (e.g., chirps) or signal groups, such as 8, 16, 32, 64, 128, 256, 512, 1024, 2048, 4096, 2-32, 32-128, 64-1024, 64-256, 128-512, 256-1024, 1024-4096, or more than 4096. The frame size (e.g., number of probe signals in a frame) can be predetermined, dynamically determined, and/or determined in any other suitable manner.

S110 can be performed continuously, periodically, sporadically, and/or with any other suitable timing. S110 is preferably repeated (e.g., continuously, such as transmitting another set of probe signals immediately or substantially immediately after finishing transmission of a first set of probe signals, etc.), but can alternatively be performed only once. These repetitions can include transmitting the same set of probe signals or different probe signals. For example, the sets can have the same or different transmission sequences, can have the same or different idle times, can have the same or different chirp configurations (e.g., phase modulation, bandwidth, sampling rate, etc.), and/or can differ or be the same in any other suitable manners. In some examples, the number and/or characteristics (e.g., temporal characteristics such as order, duration, and/or idle time; phase characteristics such as encoding; spectral characteristics such as frequency, bandwidth, and/or slope; etc.) of the signals can be modified (e.g., between different frames) such as described below in more detail (e.g., regarding S152).

The probe signals are preferably transmitted concurrently (or substantially concurrently) with performance of other elements of the method 100 (e.g., S120 and/or S130). For example, the method 100 can include continuously transmitting sets of probe signals S110 while receiving sets of reflected probe signals S120 (e.g., probe signals emitted during the same performance of S110, a previous performance of S110, etc.), and preferably while decoding the sets of received probe signals S130, evaluating interference in the received probe signals S140, and/or compensating for such interference S150.

In some embodiments, one or more probe signal properties can be uniform or substantially uniform between the probe signals (e.g., between chirps of a frame, of multiple frames, etc.). In examples, such uniform properties can include one or more frequency properties, such as: characteristic frequencies (e.g., start frequency, end frequency, mean frequency, etc.) of the probe signals, probe signal slope, probe signal bandwidth, etc.; timing properties such as probe signal duration and/or delay time duration (i.e., inter-probe delay); phase modulation properties such as phase encodings; and/or any other suitable probe signal (e.g., chirp) properties. For example, each chirp (e.g., of a frame, of multiple frames, etc.) can begin at the same start frequency and cover at least a shared frequency range (e.g., from the start frequency over a range spanning the minimum chirp bandwidth exhibited by the chirps), but some chirps (e.g., chirps having bandwidth greater than the minimum chirp bandwidth) may also cover a greater frequency range. However, the probe signals can additionally or alternatively include no such uniform or substantially uniform properties, wherein all probe signal properties vary between the different probe signals, and/or the probe signals can be characterized by any other suitable properties.

Although described herein in some instances as "chirps", a person of skill in the art will recognize that the probe signals can additionally or alternatively include any other suitable waveforms, and that descriptions herein pertaining to chirps may analogously be applied to any other suitable probe signals.

However, S110 can additionally or alternatively include transmitting any other suitable set of probe signals in any suitable manner.

3.2 Receiving a Set of Reflected Probe Signals.

Receiving a set of reflected probe signals S120 preferably functions to determine information associated with reflections (e.g., from targets in the environment) of the probe signals transmitted in S110. S120 preferably includes determining (e.g., measuring) phase, magnitude, and/or frequency information from reflected probe signals ("return signals" or "returns"), but S120 may additionally or alternatively include measuring any available characteristics of the returns. S120 preferably includes determining any data necessary to recover signal identification information (e.g., information for determining which signal, such as which signal of a signal group or of the transmitted set, the reflected probe signal corresponds to). S120 can optionally include phase shifting some or all of the received signals (e.g., using phase shift elements associated with the receivers), and/or processing the received signals in any other suitable manner.

S120 preferably includes storing some or all of the received signals. The received signals can be stored at each receiver (e.g., storing signals received by that receiver), stored at a centralized storage element (e.g., associated with a computing element such as the signal processor 240), and/or stored in any other suitable location(s). The stored signals preferably include all signals of a signal group or of a frame (and can optionally include signals of multiple signal groups or frames). However, S120 can additionally or alternatively include storing any other suitable received signals in any suitable manner.

However, S120 can additionally or alternatively include receiving the set of reflected probe signals in any other suitable manner.

3.3 Decoding the Set of Received Probe Signals.

The method can optionally include decoding the set of received probe signals S130. For example, S130 can be performed in embodiments in which the transmitted and/or received probe signals are encoded, such as using a phase encoding (e.g., as described above in more detail, such as regarding S110) and/or temporal encoding. Decoding the set of received probe signals S130 can function to convert the received signals (e.g., encoded signals) into signals that can be used to determine information (e.g., relative position and/or velocity) about the targets off of which the signals were reflected.

S130 preferably includes one or more elements such as described in U.S. Patent Application 62/958,920, filed 9 Jan. 2020 and titled "SYSTEMS AND METHODS FOR PHASE-MODULATED RADAR DETECTION", which is herein incorporated in its entirety by this reference (e.g., wherein S130 is performed such as described in U.S. Patent Application 62/958,920 regarding "decoding the set of received probe signals S130"). However, S130 can additionally or alternatively include decoding the set of received probe signals in any other suitable manner.

In some embodiments, the method can include performing S110, S120, and S130 (or a subset thereof) repeatedly, such as performing them continuously (optionally along with any other suitable elements of the method, such as S140 and/or S150). In various examples, S130 can be performed before S140 and/or S150 (e.g., wherein S140 and/or S150 is performed based on the decoded signals), after S140 and/or S150 (e.g., wherein S140 and/or S150 is performed based on encoded signals, such as the signals as-received), between elements of S140 and/or S150 (e.g., after correcting collected data S151 but before modifying probe signal characteristics S152, between elements of modifying probe signal characteristics S152, etc.), and/or with any other suitable timing. However, the method can additionally or alternatively include performing these elements (or a subset thereof, such as only S110 and S120) with any other suitable timing.

3.4 Evaluating Interference.

Evaluating interference S140 preferably functions to characterize the effects of interference (e.g., with respect to use of the returns to determine information about objects in the environment). S140 preferably includes detecting interference in the returns and/or evaluating the detected interference. The interference (e.g., interfering signals) can include received signals originating from other transmitters and/or RF sources (e.g., transmitted at substantially the same frequency and time as the probe signals transmitted in S110). For example, the interfering signals can include crossing interference, where a probe signal chirp and an interfering signal chirp coincide in frequency and time (e.g., as shown in FIGS. 4A and/or 4C). However, the interference evaluated in S140 can additionally or alternatively include any other suitable interference that may affect (e.g., negatively affect) efforts to determine information using radar systems and/or methods.

Figure 5A:
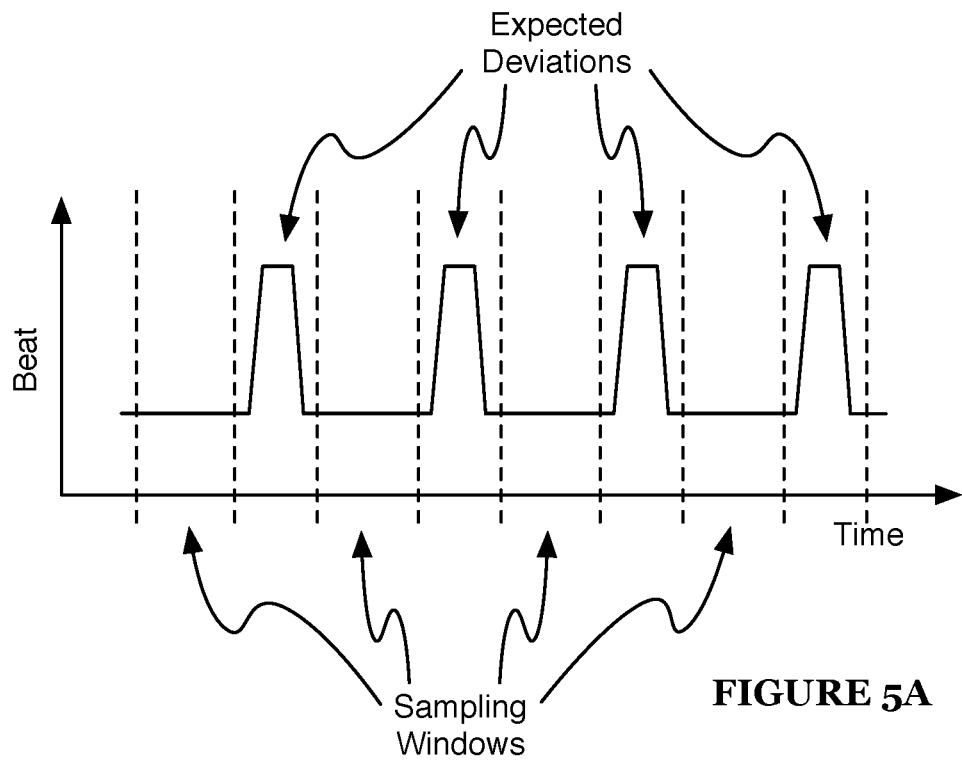
FIG. 5A is a schematic representation of an example of a beat pattern associated with probe signals.
Figure 5B:
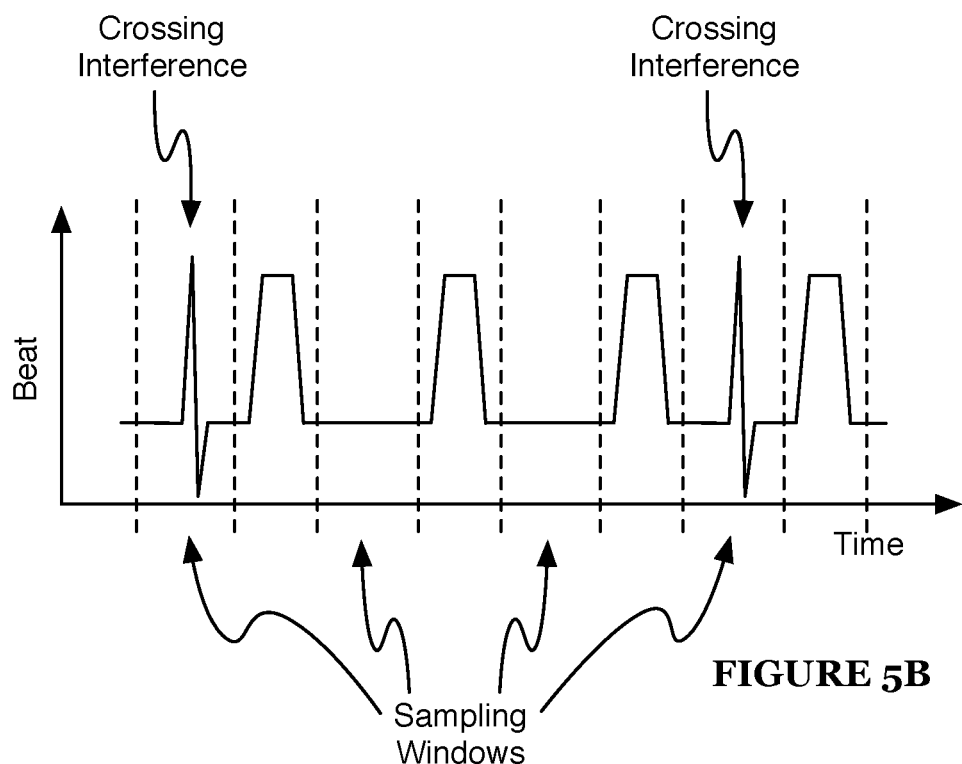
FIG. 5B is a schematic representation of an example of a beat pattern associated with probe signals in the presence of an example interference signal.
Figure 6:
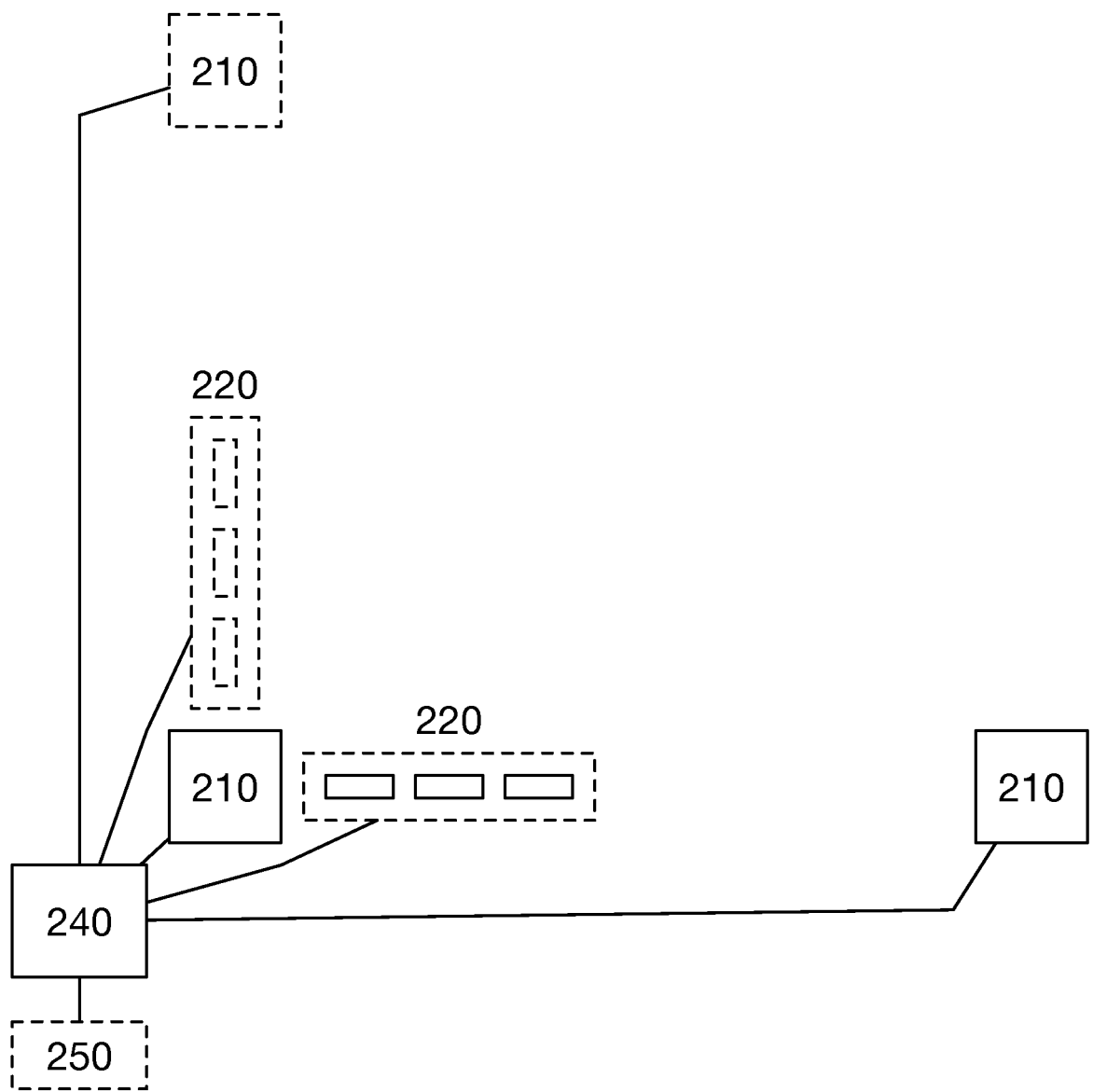
FIGS. 6-7 are schematic representations of a first and second example, respectively, of the system.
Figure 7:
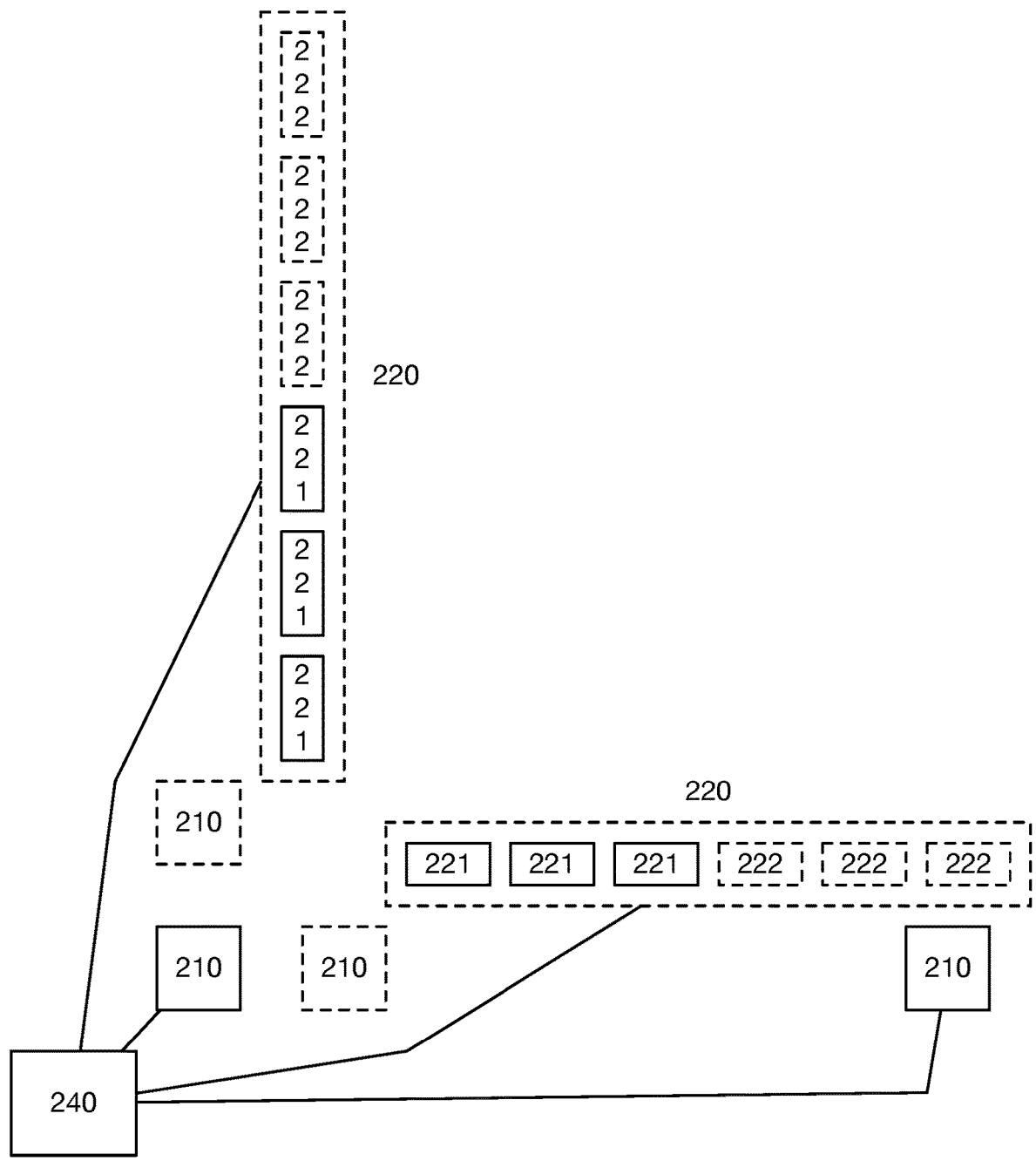

In one embodiment, detecting such interference can include detecting unexpected features (e.g., spikes) in an intermediate frequency (IF) signal (e.g., waveform), preferably a beat signal (e.g., as shown in FIGS. 5A-5B). For example, such unexpected features can be detected by searching for significant deviations from the mean of the beat signal of (e.g., difference, such as absolute difference, between) the transmitted and received probe signals, preferably excluding the expected (e.g., periodic) deviations arising from waveform edges (e.g., transitions between chirps). Such deviations can be significant compared to an absolute metric, relative to the mean value, relative to a standard deviation of the difference, and/or defined as significant in any other suitable manner. However, S140 can additionally or alternatively include detecting interference in the received signals in any other suitable manner.

Evaluating the detected interference preferably functions to evaluate the extent and/or effects of the detected interference. For example, evaluating interference can include determining the number of interference events, rate of interference event occurrence, intensity (e.g., mean, median, maximum, etc.) of interference events, and/or any other suitable descriptive characteristics associated with the interference events detected. Evaluating the detected interference can additionally or alternatively include determining what information (typically range and/or Doppler velocity information, but additionally or alternatively angle and/or any other suitable information) has been lost due to the interference (e.g., what information would have been possible to determine in the absence of such interference). However, S140 can additionally or alternatively include evaluating the detected interference in any other suitable manner.

The method preferably includes performing S140 repeatedly (e.g., in response to each performance of S120 and/or S130), but can additionally or alternatively be performed with any other suitable timing. S140 is preferably performed for all returns received in S120, but can additionally or alternatively be performed for any suitable subset thereof (and/or performed based on any other suitable signals).

S140 is preferably performed based on the decoded returns (e.g., decoded in S130), which can enable increased interference detection accuracy (e.g., increased detection of true interference events, decreased "false positive" interference detection, etc.). For example, coherent accumulation of a signal over a known pattern (e.g., encoding sequence, such as a phase and/or timing sequence) during decoding can lead to more facile discrimination between the true (un-interfered) signal and the interference events. However, S140 can additionally or alternatively be performed based on the as-received returns, returns processed in any other suitable manner, and/or any other suitable signals.

3.5 Compensating for Interference.

The method can optionally include compensating for interference S150. S150 can function to reduce the deleterious effects of interference signals on radar-based determination of information using the system and/or method. Compensating for interference S150 is preferably performed in response to detecting the presence of interference (e.g., in S140), such as any interfering signal or interfering signals evaluated to be responsible for more than a threshold amount of interference with radar-based information determination (e.g., about objects in the environment). Compensating for interference S150 preferably functions to adjust system operation and/or data analysis in response to the interference (e.g., based evaluations made in S140), such as to reduce impacts of the interference on previous and/or future returns. Compensating for interference S150 can include correcting collected data S151 and/or modifying probe signal characteristics S152.

Correcting collected data S151 preferably includes filtering out interference events (e.g., interference detected in S140), such as by removing the measurements made during (and/or around) the detected interference event from the data to be analyzed. The measurements are preferably filtered in the time domain, but can additionally or alternatively be filtered in the frequency domain and/or in any other suitable representation of the signal. Such removed data can optionally be replaced by alternate data (e.g., before data analysis). In some embodiments of the method (e.g., in which the probe signals are aperiodic or pseudo-aperiodic, in which the probe signals are dynamically modulated, etc.), the portion(s) of the probe signals that are filtered out may from signal to signal (e.g., relative to the signal's onset time) and/or frame to frame. Such variation can reduce the negative impacts of the interference, and/or can enable and/or improve the utility of one or more data replacement techniques (e.g., as described below in more detail). However, such data replacement techniques can additionally or alternatively be employed in any other suitable embodiments of the method (e.g., those in which the probe signals are substantially periodic and/or the interference signals cause interference in substantially the same portions of the probe signals over time).

In a first example, the removed data can be replaced by zero-padding (e.g., in the time domain). In this example, after zero-padding, the data (or a subset thereof, such as a subset surrounding the zero-padded region) is preferably smoothed (e.g., via a smoothing window) and/or otherwise filtered. These zero-padding approaches may lead to impaired detection of some targets (e.g., due to the resulting increased impact of sidelobes on sampled data analysis), such as targets producing only low-intensity returns. However, this impairment may be mitigated in some embodiments of the method, such as embodiments in which the method includes implementing one or more dynamic (e.g., adaptive) modulation approaches (e.g., phase, temporal, and/or other probe signal characteristic modulation, etc.), for example, approaches such as those described herein (e.g., as described above regarding S110 and/or below regarding S152, etc.).

In a second example, the removed data can be replaced by interpolated (e.g., locally interpolated) data, such as interpolated based on neighboring time samples (e.g., two or more temporally-closest samples, such as one before and one after, two before and two after, five before and five after, etc.), preferably samples from the same probe signal (e.g., chirp). For example, the removed data can be replaced with linearly interpolated data (e.g., interpolated in the time domain) based on the two or more temporally-closest time samples that were not removed (e.g., the last ADC sample taken before the interference event and the first ADC sample taken after the interference event).

In a third example, such data can be replaced based on analogous information determined from other probe signals (e.g., samples from an analogous chirp sequence that was transmitted at a different time). Such other probe signals can include previous probe signals (e.g., returns already received in the current and/or previous iterations of S120) and/or future probe signals (e.g., returns yet to be received during the current and/or future iterations of S120). Such replacement can be enabled (and/or improved in efficacy) by the probe signal characteristic variations described above in more detail (e.g., temporal variations, phase variations, spectral variations, etc.), as such variations can result in a lower likelihood of a crossing interferer (e.g., from a periodic interference signal) blocking determination of the same or similar information for multiple different probe signals. Rather, each interference event will be more likely to block determination of different information, thereby enabling replacement of such blocked information using the complementary (e.g., analogous) information determined from other probe signals (e.g., returns for which such information was not lost).

However, S151 can additionally or alternatively include correcting the collected data in any other suitable manner.

Modifying the probe signal characteristics S152 preferably functions to reduce the extent and/or effects of interference for future sets of probe signals. In some embodiments (e.g., in which some or all interference signals are generated by other radar systems, such as wherein the interference signals are probe signals transmitted by the other radar systems), S150 can additionally or alternatively function to reduce the interference effects of probe signals transmitted by the system (e.g., transmitted in S110) on the other radar systems. S152 can include making temporal modifications, phase modifications, frequency modifications, slope modifications, and/or any other suitable probe signal characteristic modifications.

Figure 4D:
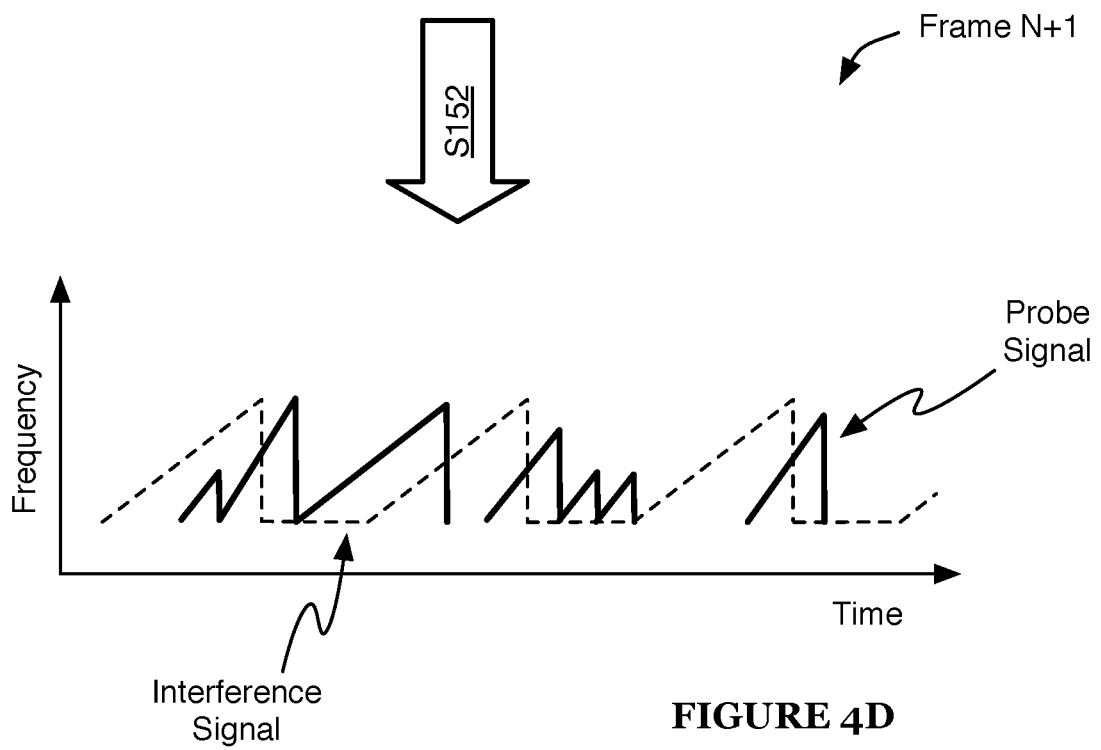

The temporal modifications preferably function to reduce temporal overlap between the transmitted probe signals and the interfering signals. Making such temporal modifications can include estimating interfering signal characteristics, such as period, idle time, frequency range, slope, and/or any other suitable characteristics. Such characteristics can be determined based on the detected interference (e.g., wherein the frequency of the interfering character of the interfering signal is known at each time point where interference is detected). Based on the estimated interference signal characteristics, the probe signal timing is preferably modified to reduce crossing interference occurrences. For example, modifying probe signal timing can include adjusting the chirp start time and/or idle time to minimize temporal overlap between transmitted probe signals and interfering probe signals (e.g., attempt to transmit probe signals during the interferer's idle periods, such as shown by way of examples in FIGS. 4B and/or 4D) and/or to minimize coincident frequency proximity between transmitted probe signals and interfering probe signals (e.g., attempt to transmit probe signals such that the interferer is transmitting at a higher frequency within a band while the probe signals are transmitted at a lower frequency within the band, or vice versa, such as shown by way of example in FIG. 4D).

In some examples, making temporal modifications could include only adjusting a long delay time between groups of probe signals, and otherwise keeping the groups of probe signals unchanged (e.g., imposing a variable delay between frames, such as between frames that are otherwise substantially equivalent to each other). However, such limited modifications may not provide sufficient flexibility to fully achieve the desired function(s) of S152 (e.g., with such a limitation, interference may not be decreased as much as would be possible in other examples in which more extensive modifications are made). Accordingly, it may be preferable to make more extensive temporal modifications, such as altering probe signal durations, delay times between probe signals (e.g., short delay times between probe signals, such as probe signals of the same frame), and/or the ordering of probe signals within a frame (e.g., swapping a first and second probe signal, otherwise reordering a sequence of probe signals from one frame to the next, etc.).

However, S152 can additionally or alternatively include performing any other suitable temporal modifications (or no such modifications).

S152 can additionally or alternatively include modifying phase characteristics of the probe signals (e.g., such as described above regarding S110). In some embodiments, S152 includes one or more elements described in 62/958,920, filed 9 Jan. 2020 and titled "SYSTEMS AND METHODS FOR PHASE-MODULATED RADAR DETECTION", which is herein incorporated in its entirety by this reference (e.g., wherein the phase characteristics are modified such as described in U.S. Patent Application 62/958,920 regarding "modifying probe signal characteristics S150", which can be performed to mitigate interference such as described herein and/or to enable array multiplication such as described in U.S. Patent Application 62/958,920). Modifying phase characteristics of the probe signals can function to spread out the effects of the interfering signal(s), such as wherein interfering signals can be (partially or substantially entirely) filtered out during performance of the method (e.g., as a consequence of decoding the returns in S130). By using a phase encoding that is substantially different from (e.g., having low correlation with, substantially uncorrelated with, substantially orthogonal to, etc.) the interfering signal, the interfering signal can result in a (preferably negligible) increase in broadband noise, rather than a blocking signal that entirely prevents or significantly hampers determination of specific information (e.g., range, Doppler velocity, angle, etc.) about the objects in the environment.

S152 can additionally or alternatively include modifying the probe signal frequencies (e.g., start frequency, bandwidth, etc.). For example, the probe signals can be moved to a different frequency band (e.g., If less interference is present in the new frequency band). S152 can additionally or alternatively include modifying probe signal slope characteristics, which preferably includes increasing a difference between the probe signal slope and interfering signal slope (e.g., thereby reducing the amount of time for which the signals are within a threshold frequency difference, and thus the interfering signal is contributing significantly to interference, during each crossing interference event). S152 can additionally or alternatively include modifying any other suitable characteristics of the transmitted probe signals (e.g., such as described above regarding S110).

S152 is preferably performed based on the information determined in S140 (e.g., information determined based on the most recently received probe signals and/or based on previously received probe signals, etc.). In some embodiments, the probe signal characteristic modifications can be iteratively updated based on the effects that previous modifications (e.g., made in previous iterations of S152, based on previous iterations of S140) had on detected interference. For example, iterative performance of S152 (e.g., along with other elements of the method) can function to perform a search for optimal probe signal characteristic modifications (e.g., optimal for minimizing interference). In some iterations, probe signal characteristic modifications may result in increased interference. In response to such an increase, S152 can include undoing such modifications and/or making modifications in an opposing direction to the deleterious modification. However, the method can additionally or alternatively include any other suitable elements performed with any suitable timing.

However, S150 can additionally or alternatively include compensating for interference in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:
1. A method for radar interference mitigation, comprising:
at a radar array, during a first time interval, transmitting a first set of radar probe signals, wherein:
the first set of radar probe signals defines a first timing sequence, the first timing sequence defining a first set of probe signal durations and inter-probe delays;
the first set of radar probe signals is reflected by a set of targets in an environment surrounding the radar array to generate a first set of reflected signals;
at the radar array, during the first time interval, sampling a first set of radio frequency (RF) signals from the environment, the first set of RF signals comprising:
the first set of reflected signals; and
a first interference signal;
based on the first set of radar probe signals and the first set of RF signals, generating a first intermediate frequency (IF) signal;
detecting a set of crossing interference events within the first IF signal;
based on the set of crossing interference events, determining a second timing sequence different from the first timing sequence, the second timing sequence defining a second set of probe signal durations and inter-probe delays, wherein at least one probe signal duration of the second set of probe signal durations and inter-probe delays differs from a corresponding probe signal duration of the first set of probe signal durations and inter-probe delays;
at the radar array, during a second time interval after the first time interval, transmitting a second set of radar probe signals, wherein:
the second set of radar probe signals defines the second timing sequence; and
the second set of radar probe signals is reflected by the set of targets to generate a second set of reflected signals; and
at the radar array, during the second time interval, sampling a second set of RF signals from the environment, the second set of RF signals comprising the second set of reflected signals.

2. The method of claim 1, wherein detecting the set of crossing interference events is performed based on a time-domain representation of the first IF signal.

3. The method of claim 1, wherein:
a first radar probe signal of the first set of radar probe signals corresponds to a second radar probe signal of the second set of radar probe signals;
a first radar probe signal duration of the first radar probe signal is substantially different from a second radar probe signal duration of the second radar probe signal;
a third radar probe signal of the first set of radar probe signals corresponds to a fourth radar probe signal of the second set of radar probe signals; and a third radar probe signal bandwidth of the third radar probe signal is substantially different from a fourth radar probe signal bandwidth of the fourth radar probe signal.

4. The method of claim 3, wherein a third radar probe signal duration of the third radar probe signal is substantially different from a fourth radar probe signal duration of the fourth radar probe signal.

5. The method of claim 1, wherein each radar probe signal of the first set of radar probe signals and the second set of radar probe signals has a substantially equal RF start frequency.

6. The method of claim 1, wherein each radar probe signal of the first set of radar probe signals and the second set of radar probe signals is an RF chirp.

7. The method of claim 1, wherein:
transmitting the first set of radar probe signals further comprises phase modulating the first set of radar probe signals based on a first encoding;
the method further comprises, before detecting the set of crossing interference events, decoding, based on the first encoding, an encoded element, wherein the encoded element is:
the first set of RF signals; or
the first IF signal; and
transmitting the second set of radar probe signals comprises phase modulating the second set of radar probe signals based on a second encoding.

8. The method of claim 7, wherein the second encoding is substantially different from the first encoding.

9. The method of claim 8, further comprising determining the second encoding based on the set of crossing interference events.

10. The method of claim 7, wherein:
the encoded element is the first set of RF signals; and
generating the first IF signal is performed after decoding the first set of RF signals based on the first encoding.

11. The method of claim 1, wherein determining the second timing sequence comprises:
based on the set of crossing interference events, predicting a timing characteristic of the first interference signal; and
determining the second timing sequence based on the timing characteristic.

12. The method of claim 11, wherein:
predicting the timing characteristic comprises predicting a predicted waveform of the first interference signal; and
determining the second timing sequence is performed such that the second set of radar probe signals would not intersect the predicted waveform.

13. The method of claim 1, wherein:
the first set of radar probe signals comprises a first subset of radar probe signals, the first subset of radar probe signals comprising a plurality of radar probe signals; and
a set of probe signal properties varies between the radar probe signals of the first subset of radar probe signals, wherein the set of probe signal properties comprises at least two of: probe signal duration, bandwidth, and phase modulation;
the second set of radar probe signals comprises a second subset of radar probe signals defining a bijective mapping onto the first subset of radar probe signals; and
for each radar probe signal of the second subset of radar probe signals, the set of probe signal properties of the radar probe signal is substantially identical to the set of probe signal properties of a corresponding radar probe signal of the first subset of radar probe signals, wherein the corresponding radar probe signal of the first subset of radar probe signals corresponds to the radar probe signal under the bijective mapping.

14. The method of claim 13, wherein:
the first subset of radar probe signals defines a first order; and
the second subset of radar probe signals defines a second order different from the first order.

15. The method of claim 1, further comprising, for each crossing interference event of the set of crossing interference events, generating replacement data to replace a respective portion of interference-indicative data, wherein the respective portion of interference-indicative data is indicative of the crossing interference event.

16. A method for radar interference mitigation, comprising:
at a radar array, transmitting a first set of radar probe signals, comprising varying a probe signal property, according to a first variation pattern, between radar probe signals of the first set of radar probe signals, wherein:
the probe signal property is bandwidth or duration;
the first set of radar probe signals is reflected by a set of targets in an environment surrounding the radar array to generate a first set of reflected signals;
at the radar array, sampling a first set of radio frequency (RF) signals from the environment, the first set of RF signals comprising:
the first set of reflected signals; and
a first interference signal;
based on the first set of radar probe signals and the first set of RF signals, generating a first intermediate frequency (IF) signal;
detecting a set of crossing interference events within the first IF signal; and
for each crossing interference event of the set of crossing interference events, generating replacement data to replace a respective portion of interference-indicative data, wherein the respective portion of interference-indicative data is indicative of the crossing interference event.

17. The method of claim 16, wherein, for a first crossing interference event of the set of crossing interference events, associated with a first radar probe signal of the first set of radar probe signals, generating the replacement data is performed based on the first set of RF signals, comprising selecting, from the first set of radar probe signals, a substitute subset of radar probe signals to provide analogous information, wherein the analogous information is analogous to the first radar probe signal.

18. The method of claim 16, further comprising:
at the radar array, transmitting a second set of radar probe signals, wherein the second set of radar probe signals is reflected by the set of targets to generate a second set of reflected signals; and
at the radar array, sampling a second set of RF signals from the environment, the second set of RF signals comprising the second set of reflected signals;
wherein, for a first crossing interference event of the set of crossing interference events, generating replacement data to replace the respective portion of interference-indicative data is performed based on the second set of RF signals.

19. The method of claim 18, wherein transmitting the second set of radar probe signals is performed before transmitting the first set of radar probe signals.

20. The method of claim 18, wherein transmitting the second set of radar probe signals comprises varying the probe signal property, according to a second variation pattern substantially different from the first variation pattern, between radar probe signals of the second set of radar probe signals.

21. The method of claim 16, wherein, for a first crossing interference event of the set of crossing interference events, associated with a first radar probe signal of the first set of radar probe signals, generating the replacement data comprises performing time domain interpolation of the first IF signal.

22. The method of claim 16, wherein the probe signal property is bandwidth.

23. The method of claim 22, wherein transmitting the first set of radar probe signals further comprises varying a probe signal duration, according to a second variation pattern, between radar probe signals of the first set of radar probe signals.

24. The method of claim 16, wherein:
transmitting the first set of radar probe signals further comprises phase modulating the first set of radar probe signals based on a first encoding; and
the method further comprises, before detecting the set of crossing interference events, decoding, based on the first encoding, an encoded element, wherein the encoded element is:
the first set of RF signals; or
the first IF signal.

25. The method of claim 16, wherein the first set of radar probe signals are transmitted during a first time interval and the first set of RF signals are sampled during the first time interval, the method further comprising:
based on the set of crossing interference events, determining a second variation pattern substantially different from the first variation pattern;
at the radar array, during a second time interval after the first time interval, transmitting a second set of radar probe signals, comprising varying the probe signal property, according to the second variation pattern, between radar probe signals of the second set of radar probe signals, wherein the second set of radar probe signals is reflected by the set of targets to generate a second set of reflected signals; and
at the radar array, during the second time interval, sampling a second set of RF signals from the environment, the second set of RF signals comprising the second set of reflected signals.

* * * * *